(12) United States Patent
Ricci

(10) Patent No.: US 11,005,720 B2
(45) Date of Patent: May 11, 2021

(54) SYSTEM AND METHOD FOR A VEHICLE ZONE-DETERMINED RECONFIGURABLE DISPLAY

(71) Applicant: IP Optimum Limited, Dublin (IE)

(72) Inventor: Christopher Ricci, Saratoga, CA (US)

(73) Assignee: AutoConnect Holdings LLC, Newbury, MA (US)

( * ) Notice: Subject to any disclaimer, the term of this patent is extended or adjusted under 35 U.S.C. 154(b) by 0 days.

(21) Appl. No.: 16/360,018

(22) Filed: Mar. 21, 2019

(65) Prior Publication Data

US 2019/0288916 A1   Sep. 19, 2019

Related U.S. Application Data

(63) Continuation-in-part of application No. 14/976,722, filed on Dec. 21, 2015, now abandoned, which is a
(Continued)

(51) Int. Cl.
*B60K 37/00* (2006.01)
*B60K 37/06* (2006.01)
(Continued)

(52) U.S. Cl.
CPC ............ *H04L 41/14* (2013.01); *B60K 35/00* (2013.01); *B60K 37/00* (2013.01); *B60K 37/02* (2013.01);
(Continued)

(58) Field of Classification Search
CPC ............ B60K 35/00; B60K 2370/11; B60K 2370/1438; B60K 2370/146; B60K 2370/1464; B60K 2370/1472; B60K 2370/1476; B60K 2370/164; B60K 2370/166; B60K 2370/21; B60K 2370/566; B60K 2370/5894; B60K 2370/5899; B60K 2370/691; B60K 2370/81; B60K 37/00; B60K 37/02; B60K 37/06; B60K 2370/12; B60K 2370/122; B60K 2370/141; B60K 2370/1442; B60K 2370/145; B60K 2370/182; B60K 2370/334; B60K 2370/55; B60K 2370/573; B60K 2370/589; B60K 2370/5911; B60K 2370/5915;
(Continued)

(56) References Cited

U.S. PATENT DOCUMENTS 4,875,391 A * 10/1989 Leising ............... F16H 61/0206
477/155
5,829,782 A * 11/1998 Breed .................... B60N 2/002
280/735
(Continued)

*Primary Examiner* — Andrea N Long
(74) *Attorney, Agent, or Firm* — Patent Ventures, LLC

(57) ABSTRACT

Methods and systems for a heads-up configurable vehicle dash display are provided. Specifically, a configurable dash may comprise one or more displays that are capable of receiving input from a user. At least one of these displays may be configured to present a plurality of custom applications that, when manipulated by at least one user, are adapted to control and/or monitor functions associated with a vehicle and/or associated peripheral devices. It is anticipated that the function and appearance of the plurality of custom applications may be altered via user and/or processor input.

22 Claims, 18 Drawing Sheets

Related U.S. Application Data continuation of application No. 13/679,358, filed on Nov. 16, 2012, now abandoned.

(60) Provisional application No. 61/560,509, filed on Nov. 16, 2011, provisional application No. 61/637,164, filed on Apr. 23, 2012, provisional application No. 61/646,747, filed on May 14, 2012, provisional application No. 61/653,275, filed on May 30, 2012, provisional application No. 61/653,264, filed on May 30, 2012, provisional application No. 61/653,563, filed on May 31, 2012, provisional application No. 61/663,335, filed on Jun. 22, 2012, provisional application No. 61/672,483, filed on Jul. 17, 2012, provisional application No. 61/714,016, filed on Oct. 15, 2012, provisional application No. 61/715,699, filed on Oct. 18, 2012.

(51) Int. Cl.

| | | |
|---|---|---|
| *G06F 9/445* | (2018.01) | |
| *B60R 21/015* | (2006.01) | |
| *B60W 40/08* | (2012.01) | |
| *H04W 4/40* | (2018.01) | |
| *G06F 11/20* | (2006.01) | |
| *G01S 19/13* | (2010.01) | |
| *G06Q 50/26* | (2012.01) | |
| *B60R 7/04* | (2006.01) | |
| *H04L 12/24* | (2006.01) | |
| *G06F 9/54* | (2006.01) | |
| *G06K 9/00* | (2006.01) | |
| *H04W 4/90* | (2018.01) | |
| *H04W 4/50* | (2018.01) | |
| *H04W 4/80* | (2018.01) | |
| *G06F 16/24* | (2019.01) | |
| *G06F 16/29* | (2019.01) | |
| *H04W 4/48* | (2018.01) | |
| *G08G 1/017* | (2006.01) | |
| *B60R 16/037* | (2006.01) | |
| *B60W 30/182* | (2020.01) | |
| *G06F 13/14* | (2006.01) | |
| *G06F 21/10* | (2013.01) | |
| *G08G 1/14* | (2006.01) | |
| *G08G 1/16* | (2006.01) | |
| *G07C 5/02* | (2006.01) | |
| *G07C 5/08* | (2006.01) | |
| *G08G 1/01* | (2006.01) | |
| *G08G 1/0967* | (2006.01) | |
| *G08G 1/0968* | (2006.01) | |
| *G08C 19/00* | (2006.01) | |
| *G06N 5/02* | (2006.01) | |
| *H04L 29/08* | (2006.01) | |
| *H04W 84/00* | (2009.01) | |
| *G06Q 40/08* | (2012.01) | |
| *G06F 17/00* | (2019.01) | |
| *G06F 3/0484* | (2013.01) | |
| *G06F 13/364* | (2006.01) | |
| *H04N 21/482* | (2011.01) | |
| *G06Q 30/02* | (2012.01) | |
| *G01C 21/20* | (2006.01) | |
| *B60K 35/00* | (2006.01) | |
| *B60K 37/02* | (2006.01) | |
| *G06F 3/01* | (2006.01) | |
| *G06F 3/0488* | (2013.01) | |
| *B60W 40/04* | (2006.01) | |
| *B60W 40/09* | (2012.01) | |
| *G08G 1/09* | (2006.01) | |
| *G06F 3/0482* | (2013.01) | |
| *G02B 27/01* | (2006.01) | |
| *G06F 3/0481* | (2013.01) | |
| *G06T 19/00* | (2011.01) | |
| *G06F 11/30* | (2006.01) | |
| *G06F 11/32* | (2006.01) | |
| *G06F 21/12* | (2013.01) | |
| *G06F 21/33* | (2013.01) | |
| *G06F 21/62* | (2013.01) | |
| *H04L 29/06* | (2006.01) | |
| *H04L 12/58* | (2006.01) | |
| *H04W 8/22* | (2009.01) | |
| *G07C 5/00* | (2006.01) | |
| *G06F 3/0486* | (2013.01) | |
| *H04N 21/414* | (2011.01) | |
| *H04N 21/433* | (2011.01) | |
| *B60W 50/00* | (2006.01) | |
| *B60W 50/08* | (2020.01) | |
| *G06F 8/61* | (2018.01) | |
| *G06N 5/04* | (2006.01) | |
| *H04W 84/12* | (2009.01) | |

(52) U.S. Cl.
CPC ............... *B60K 37/06* (2013.01); *B60R 7/04* (2013.01); *B60R 16/037* (2013.01); *B60R 21/01512* (2014.10); *B60W 30/182* (2013.01); *B60W 40/04* (2013.01); *B60W 40/08* (2013.01); *B60W 40/09* (2013.01); *B60W 50/0098* (2013.01); *B60W 50/08* (2013.01); *G01C 21/20* (2013.01); *G01S 19/13* (2013.01); *G02B 27/0101* (2013.01); *G06F 3/017* (2013.01); *G06F 3/0481* (2013.01); *G06F 3/0482* (2013.01); *G06F 3/0484* (2013.01); *G06F 3/0486* (2013.01); *G06F 3/0488* (2013.01); *G06F 3/04817* (2013.01); *G06F 3/04842* (2013.01); *G06F 3/04847* (2013.01); *G06F 3/04883* (2013.01); *G06F 8/61* (2013.01); *G06F 9/44505* (2013.01); *G06F 9/54* (2013.01); *G06F 11/2023* (2013.01); *G06F 11/3013* (2013.01); *G06F 11/3065* (2013.01); *G06F 11/328* (2013.01); *G06F 13/14* (2013.01); *G06F 13/364* (2013.01); *G06F 16/24* (2019.01); *G06F 16/29* (2019.01); *G06F 17/00* (2013.01); *G06F 21/10* (2013.01); *G06F 21/121* (2013.01); *G06F 21/335* (2013.01); *G06F 21/629* (2013.01); *G06K 9/00355* (2013.01); *G06K 9/00362* (2013.01); *G06K 9/00832* (2013.01); *G06N 5/02* (2013.01); *G06Q 30/0265* (2013.01); *G06Q 40/08* (2013.01); *G06Q 50/26* (2013.01); *G06T 19/006* (2013.01); *G07C 5/006* (2013.01); *G07C 5/008* (2013.01); *G07C 5/02* (2013.01); *G07C 5/08* (2013.01); *G07C 5/085* (2013.01); *G07C 5/0825* (2013.01); *G07C 5/0833* (2013.01); *G08C 19/00* (2013.01); *G08G 1/012* (2013.01); *G08G 1/017* (2013.01); *G08G 1/0112* (2013.01); *G08G 1/0116* (2013.01); *G08G 1/0129* (2013.01); *G08G 1/0133* (2013.01); *G08G 1/0137* (2013.01); *G08G 1/0141* (2013.01); *G08G 1/09* (2013.01); *G08G 1/096716* (2013.01); *G08G 1/096725* (2013.01); *G08G 1/096775* (2013.01); *G08G 1/096783* (2013.01); *G08G 1/096791* (2013.01); *G08G 1/096827* (2013.01); *G08G*

1/096844 (2013.01); *G08G 1/143* (2013.01); *G08G 1/16* (2013.01); *H04L 51/36* (2013.01); *H04L 63/10* (2013.01); *H04L 67/02* (2013.01); *H04L 67/12* (2013.01); *H04L 67/125* (2013.01); *H04N 21/41422* (2013.01); *H04N 21/4331* (2013.01); *H04N 21/482* (2013.01); *H04W 4/40* (2018.02); *H04W 4/48* (2018.02); *H04W 4/50* (2018.02); *H04W 4/80* (2018.02); *H04W 4/90* (2018.02); *H04W 8/22* (2013.01); *H04W 84/005* (2013.01); *B60K 2370/11* (2019.05); *B60K 2370/146* (2019.05); *B60K 2370/1438* (2019.05); *B60K 2370/1464* (2019.05); *B60K 2370/1472* (2019.05); *B60K 2370/1476* (2019.05); *B60K 2370/164* (2019.05); *B60K 2370/166* (2019.05); *B60K 2370/21* (2019.05); *B60K 2370/566* (2019.05); *B60K 2370/5894* (2019.05); *B60K 2370/5899* (2019.05); *B60K 2370/691* (2019.05); *B60K 2370/81* (2019.05); *B60W 2040/0872* (2013.01); *B60W 2040/0881* (2013.01); *B60W 2050/0095* (2013.01); *B60W 2540/043* (2020.02); *B60W 2540/22* (2013.01); *B60W 2540/221* (2020.02); *B60W 2540/26* (2013.01); *B60W 2555/60* (2020.02); *G06F 2203/04808* (2013.01); *G06F 2221/0724* (2013.01); *G06K 2009/00939* (2013.01); *G06N 5/048* (2013.01); *H04W 84/12* (2013.01)

(58) Field of Classification Search
CPC ........ B60K 2370/592; B60K 2370/595; B60K 2370/774; B60K 2370/828; B60K 37/04; B60R 16/037; B60R 21/01512; B60R 7/04; B60R 11/02; B60R 11/0229; B60R 11/0235; B60R 11/0264; B60R 16/023; B60R 16/0234; B60R 16/03; B60R 2011/0007; B60R 25/01; G06F 3/017; G06T 19/006; H04B 1/3822
See application file for complete search history.

(56) References Cited

U.S. PATENT DOCUMENTS

| | | | | |
|---|---|---|---|---|
| 6,026,409 | A * | 2/2000 | Blumenthal | G06F 16/338 |
| 6,339,826 | B2 * | 1/2002 | Hayes, Jr. | G06F 21/121 |
| | | | | 713/166 |
| 6,356,812 | B1 * | 3/2002 | Cragun | B60K 35/00 |
| | | | | 701/1 |
| 6,466,232 | B1 * | 10/2002 | Newell | G06F 1/163 |
| | | | | 345/3.1 |
| 6,731,435 | B1 * | 5/2004 | Kormos | G02B 26/0816 |
| | | | | 345/7 |
| 6,816,783 | B2 * | 11/2004 | Hashima | G01C 21/265 |
| | | | | 340/995.16 |
| 7,053,866 | B1 * | 5/2006 | Mimran | G02B 27/01 |
| | | | | 345/8 |
| 7,683,771 | B1 * | 3/2010 | Loeb | B60K 35/00 |
| | | | | 340/461 |
| 7,881,703 | B2 * | 2/2011 | Roundtree | H04L 67/04 |
| | | | | 455/414.1 |
| 8,406,961 | B2 * | 3/2013 | Pathak | G06F 3/03547 |
| | | | | 701/48 |
| 8,447,025 | B2 | 5/2013 | Shaffer et al. | |
| 8,477,509 | B2 | 7/2013 | Snider et al. | |
| 8,924,049 | B2 | 12/2014 | Kumar et al. | |
| 8,942,888 | B2 | 1/2015 | Garrett et al. | |
| 9,233,645 | B2 | 1/2016 | Schofield et al. | |
| 9,467,515 | B1 | 10/2016 | Penilla et al. | |
| 10,159,098 | B2 | 12/2018 | O'Meara et al. | |
| 10,410,517 | B2 | 9/2019 | Groeneweg | |
| 2001/0010516 | A1 * | 8/2001 | Roh | F25D 29/00 |
| | | | | 345/169 |
| 2001/0044010 | A1 * | 11/2001 | Freeman | B32B 17/10981 |
| | | | | 428/157 |
| 2002/0169551 | A1 * | 11/2002 | Inoue | G01C 21/26 |
| | | | | 701/469 |
| 2003/0125846 | A1 * | 7/2003 | Yu | G08G 1/0962 |
| | | | | 701/1 |
| 2003/0160736 | A1 * | 8/2003 | Faso | G02B 27/01 |
| | | | | 345/8 |
| 2004/0119683 | A1 * | 6/2004 | Warn | B60R 11/02 |
| | | | | 345/156 |
| 2005/0280524 | A1 * | 12/2005 | Boone | G09F 21/04 |
| | | | | 340/461 |
| 2006/0103590 | A1 * | 5/2006 | Divon | H04M 1/6091 |
| | | | | 345/7 |
| 2006/0220904 | A1 * | 10/2006 | Jarlengrip | B62D 15/029 |
| | | | | 340/901 |
| 2006/0259210 | A1 * | 11/2006 | Tanaka | B60K 37/06 |
| | | | | 701/1 |
| 2007/0101288 | A1 * | 5/2007 | Forstall | G06F 9/451 |
| | | | | 715/781 |
| 2007/0194902 | A1 * | 8/2007 | Blanco | G01C 21/365 |
| | | | | 340/461 |
| 2007/0208860 | A1 * | 9/2007 | Zellner | H04L 67/04 |
| | | | | 709/227 |
| 2007/0213090 | A1 * | 9/2007 | Holmberg | G06F 3/04886 |
| | | | | 455/550.1 |
| 2007/0222769 | A1 * | 9/2007 | Otsuka | G01C 21/3664 |
| | | | | 345/173 |
| 2008/0143085 | A1 * | 6/2008 | Breed | B60R 21/01516 |
| | | | | 280/735 |
| 2009/0055178 | A1 * | 2/2009 | Coon | G10L 17/00 |
| | | | | 704/246 |
| 2009/0189373 | A1 * | 7/2009 | Schramm | B60R 11/0264 |
| | | | | 280/731 |
| 2009/0241883 | A1 * | 10/2009 | Nagoshi | F02N 11/0825 |
| | | | | 123/179.4 |
| 2009/0284359 | A1 * | 11/2009 | Huang | B60R 25/24 |
| | | | | 340/426.1 |
| 2010/0280711 | A1 * | 11/2010 | Chen | G06F 7/02 |
| | | | | 701/36 |
| 2010/0289632 | A1 * | 11/2010 | Seder | G02B 27/01 |
| | | | | 340/436 |
| 2011/0028138 | A1 * | 2/2011 | Davies-Moore | G06F 3/04817 |
| | | | | 455/418 |
| 2011/0082615 | A1 * | 4/2011 | Small | G06F 3/0488 |
| | | | | 701/36 |
| 2011/0105187 | A1 * | 5/2011 | Dobroth | G06F 3/0481 |
| | | | | 455/566 |
| 2011/0209079 | A1 * | 8/2011 | Tarte | B60K 35/00 |
| | | | | 715/769 |
| 2011/0225527 | A1 * | 9/2011 | Law | G06Q 10/10 |
| | | | | 715/764 |
| 2012/0029852 | A1 * | 2/2012 | Goff | G01R 31/392 |
| | | | | 702/63 |
| 2012/0131497 | A1 * | 5/2012 | Jitkoff | G06F 3/0481 |
| | | | | 715/786 |
| 2012/0323767 | A1 * | 12/2012 | Michael | G06Q 40/00 |
| | | | | 705/39 |

* cited by examiner

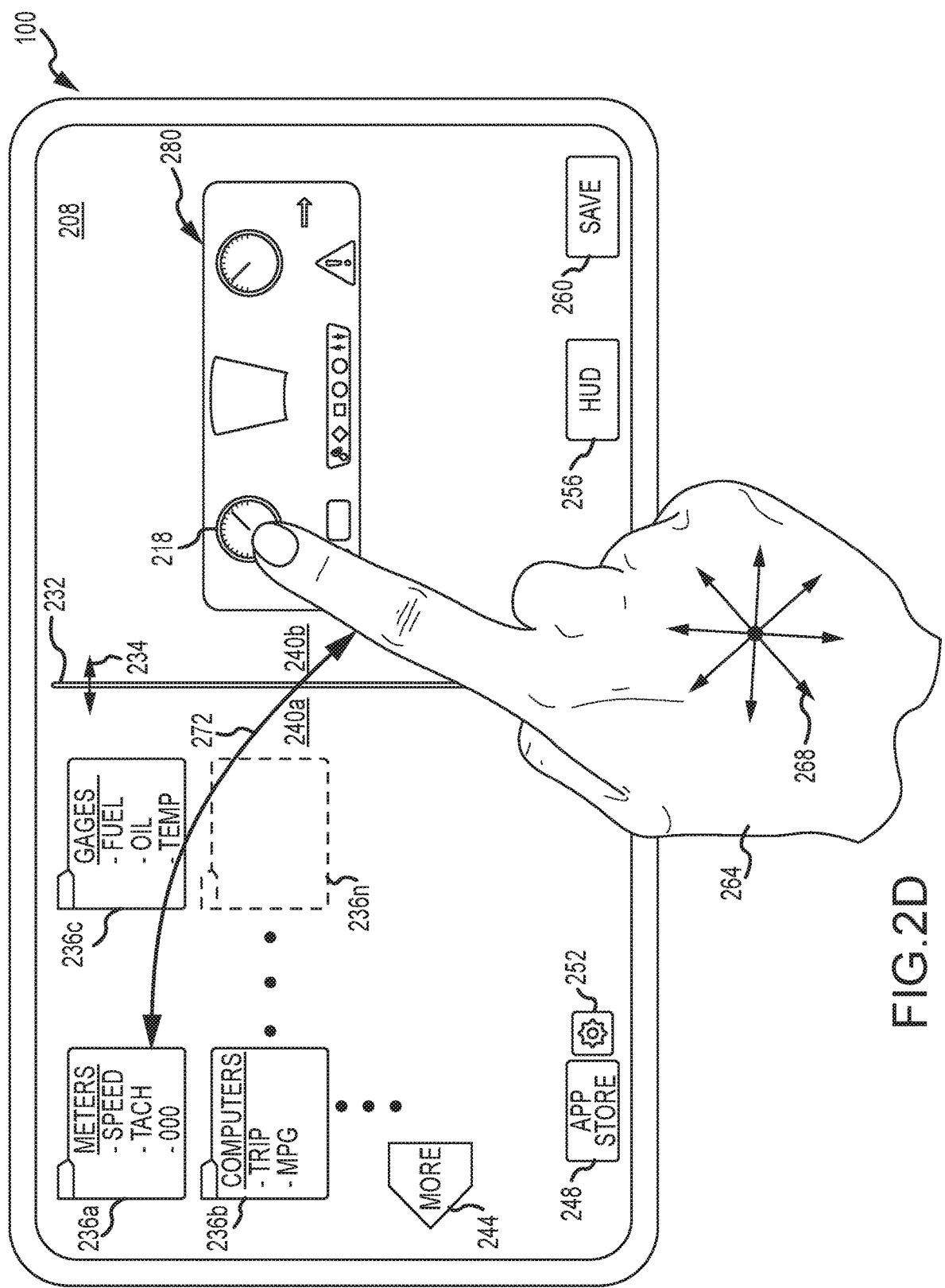

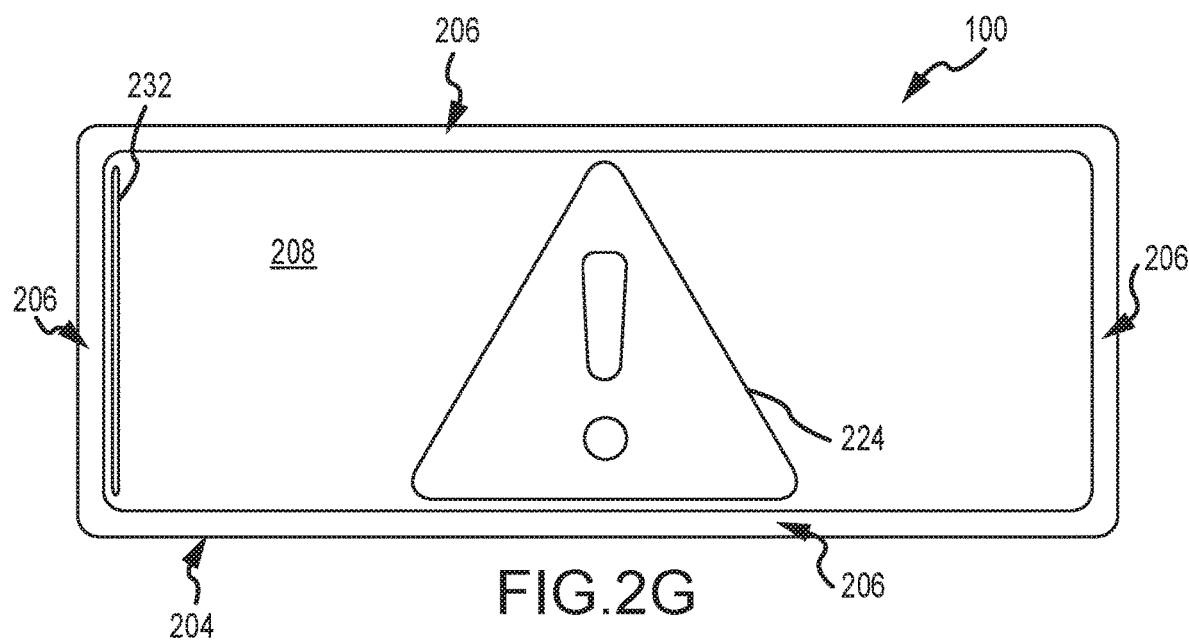

SYSTEM AND METHOD FOR A VEHICLE ZONE-DETERMINED RECONFIGURABLE DISPLAY

CROSS REFERENCE TO RELATED APPLICATIONS

The present application is a continuation in part of Ser. No. 14/976,722 filed on Dec. 21, 2015. Further yet, this application is a continuation of and claims priority to U.S. patent application Ser. No. 13/679,358, filed Nov. 16, 2012, of the same title, which claims the benefits of and priority, under 35 U.S.C. § 119(e), to U.S. Provisional Application Ser. No. 61/560,509, filed on Nov. 16, 2011, entitled "Complete Vehicle Ecosystem"; 61/637,164, filed on Apr. 23, 2012, entitled "Complete Vehicle Ecosystem"; 61/646,747, filed on May 14, 2012, entitled "Branding of Electrically Propelled Vehicles Via the Generation of Specific Operating Sounds"; 61/653,275, filed on May 30, 2012, entitled "Vehicle Application Store for Console"; 61/653,264, filed on May 30, 2012, entitled "Control of Device Features Based on Vehicle State"; 61/653,563, filed on May 31, 2012, entitled "Complete Vehicle Ecosystem"; 61/663,335, filed on Jun. 22, 2012, entitled "Complete Vehicle Ecosystem"; 61/672,483, filed on Jul. 17, 2012, entitled "Vehicle Climate Control"; 61/714,016, filed on Oct. 15, 2012, entitled "Vehicle Middleware"; and 61/715,699, filed Oct. 18, 2012, entitled "Vehicle Middleware." The entire disclosures of the applications listed above are hereby incorporated by reference, in their entirety, for all that they teach and for all purposes.

This application is also related to U.S. patent application Ser. No. 13/420,236, filed on Mar. 14, 2012, entitled, "Configurable Vehicle Console"; Ser. No. 13/420,240, filed on Mar. 14, 2012, entitled "Removable, Configurable Vehicle Console"; Ser. No. 13/462,593, filed on May 2, 2012, entitled "Configurable Dash Display"; Ser. No. 13/462,596, filed on May 2, 2012, entitled "Configurable Heads-Up Dash Display"; Ser. No. 13/679,459, filed on Nov. 16, 2012, entitled "Vehicle Comprising Multi-Operating System"; Ser. No. 13/679,234, filed on Nov. 16, 2012, entitled "Gesture Recognition for On-Board Display"; Ser. No. 13/679,412, filed on Nov. 16, 2012, entitled "Vehicle Application Store for Console"; Ser. No. 13/679,857, filed on Nov. 16, 2012, entitled "Sharing Applications/Media Between Car and Phone (Hydroid)"; Ser. No. 13/679,878, filed on Nov. 16, 2012, entitled "In-Cloud Connection for Car Multimedia"; Ser. No. 13/679,875, filed on Nov. 16, 2012, entitled "Music Streaming"; Ser. No. 13/679,676, filed on Nov. 16, 2012, entitled "Control of Device Features Based on Vehicle State"; Ser. No. 13/678,673, filed on Nov. 16, 2012, entitled "Insurance Tracking"; Ser. No. 13/678,691, filed on Nov. 16, 2012, entitled "Law Breaking/Behavior Sensor"; Ser. No. 13/678,699, filed on Nov. 16, 2012, entitled "Etiquette Suggestion"; Ser. No. 13/678,710, filed on Nov. 16, 2012, entitled "Parking Space Finder Based on Parking Meter Data"; Ser. No. 13/678,722, filed on Nov. 16, 2012, entitled "Parking Meter Expired Alert"; Ser. No. 13/678,726, filed on Nov. 16, 2012, entitled "Object Sensing (Pedestrian Avoidance/Accident Avoidance)"; Ser. No. 13/678,735, filed on Nov. 16, 2012, entitled "Proximity Warning Relative to Other Cars"; Ser. No. 13/678,745, filed on Nov. 16, 2012, entitled "Street Side Sensors"; Ser. No. 13/678,753, filed on Nov. 16, 2012, entitled "Car Location"; Ser. No. 13/679,441, filed on Nov. 16, 2012, entitled "Universal Bus in the Car"; Ser. No. 13/679,864, filed on Nov. 16, 2012, entitled "Mobile Hot Spot/Router/Application Share Site or Network"; Ser. No. 13/679,815, filed on Nov. 16, 2012, entitled "Universal Console Chassis for the Car"; Ser. No. 13/679,476, filed on Nov. 16, 2012, entitled "Vehicle Middleware"; Ser. No. 13/679,306, filed on Nov. 16, 2012, entitled "Method and System for Vehicle Data Collection Regarding Traffic"; Ser. No. 13/679,369, filed on Nov. 16, 2012, entitled "Method and System for Vehicle Data Collection"; Ser. No. 13/679,680, filed on Nov. 16, 2012, entitled "Communications Based on Vehicle Diagnostics and Indications"; Ser. No. 13/679,443, filed on Nov. 16, 2012, entitled "Method and System for Maintaining and Reporting Vehicle Occupant Information"; Ser. No. 13/678,762, filed on Nov. 16, 2012, entitled "Behavioral Tracking and Vehicle Applications"; Ser. No. 13/679,292, filed Nov. 16, 2012, entitled "Branding of Electrically Propelled Vehicles Via the Generation of Specific Operating Output"; Ser. No. 13/679,400, filed Nov. 16, 2012, entitled "Vehicle Climate Control"; filed on Nov. 16, 2012, entitled "Improvements to Controller Area Network Bus"; Ser. No. 13/678,773, filed on Nov. 16, 2012, entitled "Location Information Exchange Between Vehicle and Device"; Ser. No. 13/679,887, filed on Nov. 16, 2012, entitled "In Car Communication Between Devices"; Ser. No. 13/679,842, filed on Nov. 16, 2012, entitled "Configurable Hardware Unit for Car Systems"; Ser. No. 13/679,204, filed on Nov. 16, 2012, entitled "Feature Recognition for Configuring a Vehicle Console and Associated Devices"; Ser. No. 13/679,350, filed on Nov. 16, 2012, entitled "Configurable Vehicle Console"; Ser. No. 13/679,363, filed on Nov. 16, 2012, entitled "Configurable Heads-Up Dash Display"; and Ser. No. 13/679,368, filed on Nov. 16, 2012, entitled "Removable, Configurable Vehicle Console". The entire disclosures of the applications listed above are hereby incorporated by reference, in their entirety, for all that they teach and for all purposes.

BACKGROUND

Whether using private, commercial, or public transport, the movement of people and/or cargo has become a major industry. In today's interconnected world, daily travel is essential to engaging in commerce. Commuting to and from work can account for a large portion of a traveler's day. As a result, vehicle manufacturers have begun to focus on making this commute, and other journeys, more enjoyable.

Currently, vehicle manufacturers attempt to entice travelers to use a specific conveyance based on any number of features. Most of these features focus on vehicle safety, or efficiency. From the addition of safety-restraints, air-bags, and warning systems to more efficient engines, motors, and designs, the vehicle industry has worked to appease the supposed needs of the traveler. Recently, however, vehicle manufactures have shifted their focus to user and passenger comfort as a primary concern. Making an individual more comfortable while traveling instills confidence and pleasure in using a given vehicle, increasing an individual's preference for a given manufacturer and/or vehicle type.

One way to instill comfort in a vehicle is to create an environment within the vehicle similar to that of an individual's home or place of comfort. Integrating features in a vehicle that are associated with comfort found in an individual's home can ease a traveler's transition from home to vehicle. Several manufacturers have added comfort features in vehicles such as the following: leather seats, adaptive and/or personal climate control systems, music and media players, ergonomic controls, and in some cases Internet connectivity. However, because these manufacturers have added features to a conveyance, they have built comfort around a vehicle and failed to build a vehicle around comfort.

SUMMARY

There is a need for a vehicle ecosystem that can integrate both physical and mental comforts while seamlessly operating with current electronic devices to result in a totally intuitive and immersive user experience. These and other needs are addressed by the various aspects, embodiments, and/or configurations of the present disclosure. Also, while the disclosure is presented in terms of exemplary embodiments, it should be appreciated that individual aspects of the disclosure can be separately claimed.

A method of configuring a heads-up display ("HUD") of a vehicle dash, comprising: displaying, at a first time, vehicle dash information in a first layout on at least one of a graphical user interface ("GUI") and a HUD unit to project the vehicle dash information above a vehicle dash, wherein the vehicle dash information comprises one or more applications, and wherein the one or more applications correspond to vehicle readouts such as a speedometer, odometer, tachometer, trip meter, fuel gage, temperature gage, electrical system gage, and indicators; receiving a first input at the GUI, wherein the first input corresponds to an instruction to alter the first layout of the vehicle dash information to a second layout of the vehicle dash information, and wherein the second layout of the vehicle dash information is different from the first layout of the vehicle dash information; selecting, by a processor, the second layout of the vehicle dash information to display on the GUI and project by the HUD unit; and displaying, at a second time, the second layout of the vehicle dash information by the HUD unit.

A method of configuring an appearance of one or more applications shown on a heads-up display ("HUD") of a vehicle dash, comprising: displaying, at a first time, a first appearance of one or more applications on at least one of a graphical user interface ("GUI") and a HUD unit, wherein the one or more applications correspond to one or more instruments associated with the vehicle dash, and wherein the first appearance corresponds to at least one of a first aesthetic and a first function of the one or more applications; receiving a first input at the GUI, the first input corresponding to an instruction to alter the first appearance of the one or more applications to a second appearance of the one or more applications, and wherein the second appearance of the one or more applications is different from the first appearance of the one or more applications; selecting, by a processor, the second appearance of the one or more applications to display on the GUI and project by the HUD unit; and displaying, at a second time, the second appearance of the one or more applications by the HUD unit.

A device for configuring a heads-up display ("HUD") of a vehicle dash to display one or more vehicle applications, comprising: a Graphical User Interface ("GUI") including a first display area; an input gesture area of the first display area; a HUD unit; a vehicle signal input/output port, wherein the vehicle signal input/output port is configured to receive and send signals to and from a plurality of vehicle devices; a non-transitory computer readable medium having instructions stored thereon that, when executed by a processor, perform the method comprising: displaying, at a first time, vehicle dash information in a first layout on at least one of the GUI and the HUD unit, wherein the vehicle dash information comprises one or more applications, and wherein the one or more applications correspond to vehicle readouts such as a speedometer, odometer, tachometer, trip meter, fuel gage, temperature gage, electrical system gage, and indicators; receiving a first input at the GUI, wherein the first input corresponds to an instruction to alter the first layout of the vehicle dash information to a second layout of the vehicle dash information, and wherein the second layout of the vehicle dash information is different from the first layout of the vehicle dash information; selecting, by a processor, the second layout of the vehicle dash information to display on the GUI and project by the HUD unit; and displaying, at a second time, the second layout of the vehicle dash information by the HUD unit.

The present disclosure can provide a number of advantages depending on the particular aspect, embodiment, and/or configuration. Currently, vehicle dash displays, clusters, and the like are known to include physical and/or electrical instrumentation to provide one or more individuals with interactive elements of various vehicle features. For example, vehicles may include fuel level gages, speedometers, tachometers, indicators, night-vision displays, and other instruments accessible at a dash display or cluster. In some vehicles, the adjustment of instruments may be achieved through physical manipulation of dials, knobs, switches, keys, buttons, and the like at or adjacent to the dash display or cluster. However, the dash displays, or clusters, on most vehicles severely limit the custom configurability, functionality, and/or the location of instruments. Typically, users have access to only adjust the light intensity and in some instances background/foreground colors of a dashboard or instrument panel display. In other words, users cannot fully configure a dashboard or its display.

In one embodiment of the present disclosure a configurable (or reconfigurable) dash display is described. Specifically, the present disclosure is directed to a dash display that can be arranged to suit the settings of users, passengers, laws, rules, and/or regulations. In some cases, a dash display of a vehicle may span across, or be separated into, one or more individual screens. It is anticipated that separated screens may share software, communication, power, and even operating system control. The dash display may be configured to display various instruments, indications, warnings, media components, entertainment features, colors, backgrounds, images, and/or the like. Configurability may relate to setting one or more custom and/or predefined layouts to be displayed by one or more visual output devices, such as projected and/or reflected images, screens, and/or touch-sensitive displays. This configurable dash display may be configured to show different layouts for different zones of a vehicle based on preferences associated with one or more individuals in the different zones. It is anticipated that the configurable dash display may occupy a section and/or a substantial portion of the dash of a vehicle. In some instances the configurable dash display may span across an entire dash of a vehicle. This configuration may allow multiple users to monitor and/or access sections of the configurable dash display. For example, one user may be observing driving controls and indicators from one area of the configurable dash display, while another user (or passenger) may be watching a video and/or altering other controls from another area of the display.

In some embodiments, the custom configured display layouts may be shown in response to user recognition (whether via, key, chip, gesture, weight, heat signature, camera detection, facial recognition, and/or combinations thereof). This display of configured layouts and the user recognition may be automatically and/or manually initiated. Embodiments of the present disclosure anticipate that display layouts may be modified in response to conditions, sensor signals, communication with peripheral devices, and the like.

In another embodiment of the present disclosure, a configurable dash display is shown to incorporate various features and controls that may be selectively configured by an application, user, software, hardware, various input, and the like. Configuration may include adjustments to at least one of the size, location, available features, functions, applications, modules, and behavior of the configurable dash display. In some cases, the dash display may present applications that are capable of receiving input from at least one individual and modify at least one vehicle setting. For instance, the dash display may show a cruise control application where, the speed of the vehicle may be set through the GUI. Additionally or alternatively, the dash display may present applications directed to disability and/or accessibility. For example, the GUI may display speed controls, braking controls, and/or steering control applications, to name a few, that are configured to receive user input and alter at least one function of the vehicle, and even the vehicle control system. It is one aspect of the present disclosure to allow for the integration of custom designed templates of standard dash display layouts that users may manipulate and/or modify. In some embodiments, the layout of one or more applications may be preconfigured in templates that can be selected for display. These preconfigured layouts may be manually or automatically selected and may even be altered after selection. These configurations and/or modifications may be saved and stored. It is anticipated that a vehicle may be divided into zones, or areas of a vehicle. These zones may be associated with dash display layouts such that each zone may share a layout with at least one other zone, have display layouts that are separate from at least one other zone, and/or combinations thereof. It is anticipated that a plurality of applications may be displayed to a user associated with at least one zone. For instance, a speedometer, tachometer, and/or indication application may be displayed to a first user associated with a first zone (and even to a position of the GUI that is associated with the first zone), while a radio, media player, clock, and/or GPS application may be displayed to a second user associated with a second zone (where application or applications displayed to the second user can even be displayed to a position of the GUI that is associated with the second zone).

Further, certain controls and/or features may be selected to display in any given position on the dash display. For example, if a user wishes to view an analog speedometer of a vehicle in a specific area on the display, the user may place a "simulated-analog speedometer" module/application on the configurable dash display. The position and/or features of this module/application may be adjusted according to rules and its position may be arranged as desired by the user and/or rules. Additionally or alternatively, the user and/or rules may adjust the size of the module and/or adjust the scale of the module. For instance, in the speedometer example above, the user may wish to view a large dial and as such may increase the speedometer's size to fit the user's desire. In some embodiments, the user may adjust the scale of the displayed speed on the speedometer by specifying a different maximum upper limit. In the aforementioned scenario, the user may decrease the upper speed limit from a 160 mph gage to a 85 mph, for example. Because the speedometer described may be a simulated-analog dial, the measurement (distance) between each displayed speed may increase as the upper limit is decreased. This change in the analog scale may change the accuracy of speed displayed. It is anticipated that changes to scale, units, limits, size, and/or the like may be incorporated on all or most displayable modules/applications.

It is anticipated that at least one of the GUI and the HUD may be partitioned into two or more zones. These zones may be physical and/or virtual. For instance, a single GUI and/or HUD may include partitioned zones that represent a virtual grid of display areas. Each of the display areas may display information alone or in conjunction with other display areas of the GUI and/or HUD. As can be appreciated, each of the partitioned zones and/or each display may display vehicle dash information. In some embodiments, at least one of the display areas may be configured to display information, or data, other than vehicle dash information.

It is anticipated that recommended positions for the module, or modules, could be provided by the vehicle dash display system. If a user wishes to add a "fuel gage" module to the dash display the user can similarly select position, size, and/or other features associated with the module to best suit the user's needs. A user may access a respective or selected dash display configuration from among a plurality of different dash display configurations by inputting a code or identifier. The result is that different users of a common vehicle or common make, year, and model can have differently configured dash displays. As previously mentioned, a dash display configuration may be shown upon recognizing a particular user.

In some embodiments, these modules may be programmed to disappear, dim, or exhibit other functions in response to some type of stimulus. For example, the user may want one or more control modules to dim upon driving. Alternatively, the user may want one or more modules to disappear according to a timer or other stimulus. It is anticipated that the stimulus may include user input, timers, sensors, programmed conditions, and the like.

For example, in the event of an accident, access to a vehicle's speed, tachometer, and/or other non-essential modules is of little benefit. In an emergency scenario, the dash display may use one or more sensors, possibly including vehicle sensor (e.g., air bag sensor, gyroscope, or accelerometer), to detect the accident and provide emergency features to a user via the configurable dash display. These features may replace the standard modules arranged on the dash display (e.g., the speedometer and tachometer modules are minimized or removed, replaced by one or more emergency modules). A large "hazard" light module may be created. Additionally or alternatively, an emergency contact module may be provided to allow the user easy access to an emergency communication channel. Contacting the emergency channel could be left to the discretion of the user. As can be appreciated by one skilled in the art, these emergency modules may automatically contact an emergency channel and/or use timers and other sensors to determine whether to initiate contact with the emergency channel.

In accordance with the present disclosure, it is anticipated that the vehicle may use sensors in an individual's phone or other device to detect a specific user's heartbeat and/or monitor a user's other vital signs. These vital signs could be relayed to an emergency contact to aid in possible treatment and/or evaluate a necessary emergency response. Using a phone's, or other device's, gyroscope and/or accelerometer to detect a user's heartbeat could be achieved via storing conditions at a time prior to an accident and comparing the stored conditions to those obtained during the emergency. In the event that a user has associated his or her phone and/or device with the vehicle and/or dash display, this process of monitoring, sending, and using the vital sign information could be achieved automatically by the dash display and/or vehicle.

In some embodiments components and/or modules of the configurable dash display may be shown by a Heads-Up Display ("HUD"). The HUD, or HUD unit, may be activated by stored user preferences, manual input, and/or in response to conditions. It is anticipated that the stored preferences may include the storage of recognition features that can be interpreted by a processor and associated with at least one individual. As described above, the HUD and/or HUD layout may be initiated, configured, modified, saved, and/or deactivated in a similar or identical manner to the configurable dash display. The HUD may employ various methods and light sources to display the configurable dash display to one or more users, including but not limited to, projection, Cathode Ray Tube ("CRT"), Light Emitting Diode ("LED"), Liquid Crystal Display ("LCD"), Organic Light Emitting Diode ("OLED"), and the like. Embodiments of the present disclosure anticipate configuring the HUD and/or dash display via a touch-screen display. The touch-screen display may be part of the vehicle console, vehicle dash display, and/or other device that is associated with the vehicle. For example, a user may wish to configure the vehicle dash display from a computer, tablet, smart-phone, and/or other device that has been associated with the vehicle. The user may make and store the configurable dash display changes, which may then be transferred to the vehicle dash display automatically and/or upon detecting an input from at least one user.

It is an aspect of the present disclosure that the aforementioned configurable dash displays, whether output to one or more screens, devices, and/or shown in a HUD format, may be intentionally limited in configurability and/or display to conform with local, regional, and/or national rules, laws, and/or regulations. For instance, it may be required by a law that every vehicle dash display/cluster includes a speedometer. Although the user may configure the appearance and/or behavior of the speedometer in this case, the user may be restricted from removing a speedometer from the dash display. In embodiments, local laws may differ and the configurable dash display and/or vehicle may access location services to determine if a specific dash module is required in a given area. The location services may include GPS, Wi-Fi Access Points, Cell Towers, combinations thereof, and the like to determine a general or specific location of the vehicle. It is anticipated that the vehicle may make use of one or more devices associated with the vehicle to determine location. The dash display may reconfigure automatically upon detecting a change in location and the laws associated with the location. To prevent possible confusion surrounding the reconfiguration of a dash display, a description and/or message could accompany or precede the change to notify at least one user. For example, a vehicle may be traveling from one country that has no restrictions regarding speedometer display to another that requires the displayed speed on a speedometer to be listed in dual measurements (e.g., mph and kph). In this instance, the configurable dash display may automatically detect the location of the vehicle, refer to rules associated with the locality, and modify the dash display accordingly. These and other advantages will be apparent from the disclosure.

In the event that a user has customized a dashboard, and crosses a defined legal boundary (like a state or country border) the current location of the vehicle will define the laws to which the vehicle and associated devices and capabilities must adhere. The original, and other, configuration preferences of a user may be stored in memory. Once the user returns to a geographical location that allows the preset configuration preferences, the configurable dashboard can access the stored memory and may return the dashboard to the preset configuration. It is anticipated that specific geographical location laws could be preprogrammed into a device with which the vehicle communicates, whether the device memory is on-board or remotely located from the vehicle.

As can be appreciated, traveling across different legal boundaries and/or geographical locations, where certain instruments may be required and consequently appear and disappear from a dashboard may cause confusion to a user. It is an embodiment of the present disclosure to provide an indication to the user that a specific instrument is required in the given location and/or area. In some embodiments, the user may receive a notification upon crossing a legal boundary. In yet another embodiment, where an instrument is required and added to the dashboard, the instrument itself may contain information that it is a required instrument in the territory in which the vehicle is located. For example, if territory "X" requires an odometer to be a part of the dashboard display, the odometer may appear on the dashboard with a highlighted or otherwise emphasized "X" marker to identify the requirement and the jurisdiction. Capabilities of the console may be enabled or disabled based on vehicle location. For example, communication modes, such as texting, tweeting, email, and the like may be enabled or disabled based on vehicle location. Vehicle location may be mapped against applicable laws of a governmental entity, such as a city, municipality, county, province, state, country, and the like. Alternatively, capabilities of the console may be enabled or disabled based on contract requirements, employer rules or policies, etc.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "desktop" refers to a metaphor used to portray systems. A desktop is generally considered a "surface" that typically includes pictures, called icons, widgets, folders, etc. that can activate show applications, windows, cabinets, files, folders, documents, and other graphical items. The icons are generally selectable to initiate a task through user interface interaction to allow a user to execute applications or conduct other operations.

The term "display" refers to a portion of a screen used to display the output of a computer to a user.

The term "displayed image" refers to an image produced on the display. A typical displayed image is a window or desktop. The displayed image may occupy all or a portion of the display.

The term "display orientation" refers to the way in which a rectangular display is oriented by a user for viewing. The two most common types of display orientation are portrait and landscape. In landscape mode, the display is oriented such that the width of the display is greater than the height of the display (such as a 4:3 ratio, which is 4 units wide and 3 units tall, or a 16:9 ratio, which is 16 units wide and 9 units tall). Stated differently, the longer dimension of the display is oriented substantially horizontal in landscape mode while the shorter dimension of the display is oriented substantially vertical. In the portrait mode, by contrast, the display is oriented such that the width of the display is less than the height of the display. Stated differently, the shorter dimension of the display is oriented substantially horizontal in the portrait mode while the longer dimension of the display is oriented substantially vertical. The multi-screen display can have one composite display that encompasses all the screens. The composite display can have different display characteristics based on the various orientations of the device.

The term "gesture" refers to a user action that expresses an intended idea, action, meaning, result, and/or outcome. The user action can include manipulating a device (e.g., opening or closing a device, changing a device orientation, moving a trackball or wheel, etc.), movement of a body part in relation to the device, movement of an implement or tool in relation to the device, audio inputs, etc. A gesture may be made on a device (such as on the screen) or with the device to interact with the device.

The term "module" as used herein refers to any known or later developed hardware, software, firmware, artificial intelligence, fuzzy logic, or combination of hardware and software that is capable of performing the functionality associated with that element.

The term "gesture capture" refers to a sense or otherwise a detection of an instance and/or type of user gesture. The gesture capture can occur in one or more areas of the screen, A gesture region can be on the display, where it may be referred to as a touch sensitive display or off the display where it may be referred to as a gesture capture area.

A "multi-screen application" refers to an application that is capable of producing one or more windows that may simultaneously occupy multiple screens. A multi-screen application commonly can operate in single-screen mode in which one or more windows of the application are displayed only on one screen or in multi-screen mode in which one or more windows are displayed simultaneously on multiple screens.

A "single-screen application" refers to an application that is capable of producing one or more windows that may occupy only a single screen at a time.

The term "screen," "touch screen," or "touchscreen" refers to a physical structure that enables the user to interact with the computer by touching areas on the screen and provides information to a user through a display. The touch screen may sense user contact in a number of different ways, such as by a change in an electrical parameter (e.g., resistance or capacitance), acoustic wave variations, infrared radiation proximity detection, light variation detection, and the like. In a resistive touch screen, for example, normally separated conductive and resistive metallic layers in the screen pass an electrical current. When a user touches the screen, the two layers make contact in the contacted location, whereby a change in electrical field is noted and the coordinates of the contacted location calculated. In a capacitive touch screen, a capacitive layer stores electrical charge, which is discharged to the user upon contact with the touch screen, causing a decrease in the charge of the capacitive layer. The decrease is measured, and the contacted location coordinates determined. In a surface acoustic wave touch screen, an acoustic wave is transmitted through the screen, and the acoustic wave is disturbed by user contact. A receiving transducer detects the user contact instance and determines the contacted location coordinates.

The term "window" refers to a, typically rectangular, displayed image on at least part of a display that contains or provides content different from the rest of the screen. The window may obscure the desktop.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "vehicle" as used herein includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motor-cycles, busses, automobiles, trains, railed conveyances, boats, ships, marine conveyances, submarine conveyances, airplanes, space craft, flying machines, human-powered conveyances, and the like.

The terms "dash" and "dashboard" and variations thereof, as used herein, are used interchangeably and include any panel and/or area of a vehicle disposed adjacent to an operator, user, and/or passenger. Typical dashboards may include but are not limited to one or more control panel, instrument housing, head unit, indicator, gauge, meter, light, audio equipment, computer, screen, display, HUD unit, and graphical user interface.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

FIG. 2D depicts a fourth representation of a graphical user interface of a configurable dash display in accordance with one embodiment of the present disclosure;

FIG. 2G depicts a seventh representation of a graphical user interface of a configurable dash display in accordance with one embodiment of the present disclosure;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Presented herein are embodiments of a device. The device can comprise one device or a compilation of devices. Furthermore, the device may include one or more communications devices, such as cellular telephones, or other smart devices. This device, or devices, may be capable of communicating with other devices and/or to an individual or group of individuals. Further, this device, or these devices, can receive user input in unique ways. The overall design and functionality of each device provides for an enhanced user experience making the device more useful and more efficient. As described herein, the device(s) may be electrical, mechanical, electro-mechanical, software-based, and/or combinations thereof.

Figure 1A:
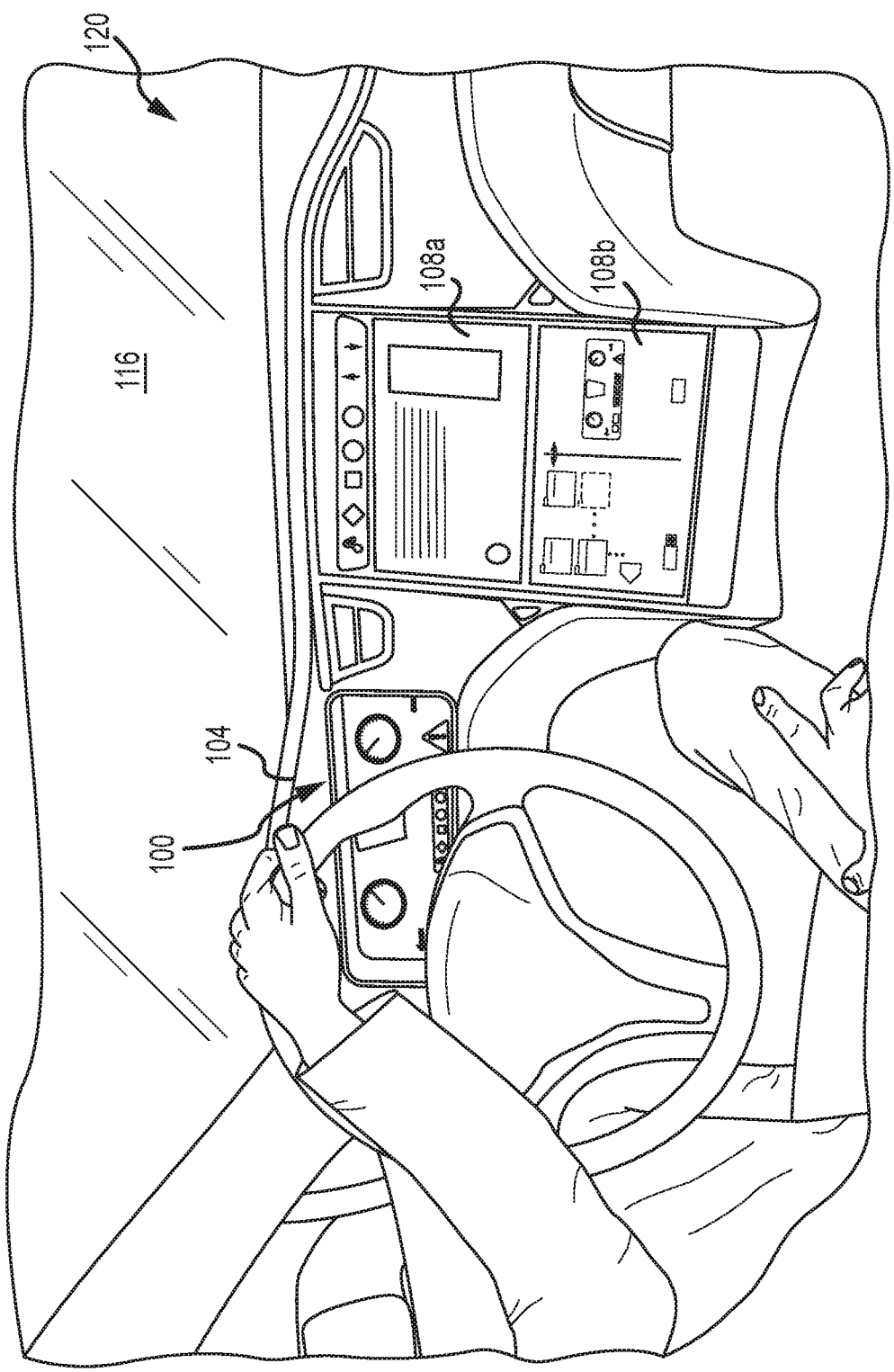
FIG. 1A depicts a first representation of a configurable dash display/cluster in a general viewing area of a vehicle in accordance with one embodiment of the present disclosure.

FIG. 1A depicts a first representation of a configurable dash display/cluster in a general viewing area of a vehicle 120 in accordance with one embodiment of the present disclosure. In some embodiments, the configurable dash display, or device, 100 may span across one or more displays. As depicted, at least one device 100 may occupy a section of a vehicle dash 104. These one or more displays may be located on or adjacent to the dash 104 of a vehicle 120. It is an aspect of the present disclosure that the configurable dash display may be located such that one or more individuals associated with a vehicle 120 can interact with and/or observe the configurable dash display. The device 100 may comprise a front screen, Graphical User Interface, and/or hardware switches or buttons.

It is anticipated that the device 100 may communicate with, and/or be operated independently of, one or more console displays 108a, 108b. Communication between the device 100 and at least one additional console display 108a, 108b may be achieved through physical and/or wireless methods. It is one aspect of the present disclosure that the device 100 may be configured at the device 100 and/or at least one console display 108a, 108b. For example, a user (e.g., a passenger) may wish to configure settings that are associated with the user while the vehicle is being operated by another. In this example, the user could safely arrange and/or configure a dash display for at least one of an operating condition and non-operating condition. The user may then save the configuration and/or arrangement in a memory location that may be associated with at least one user of the vehicle.

Figure 1B:
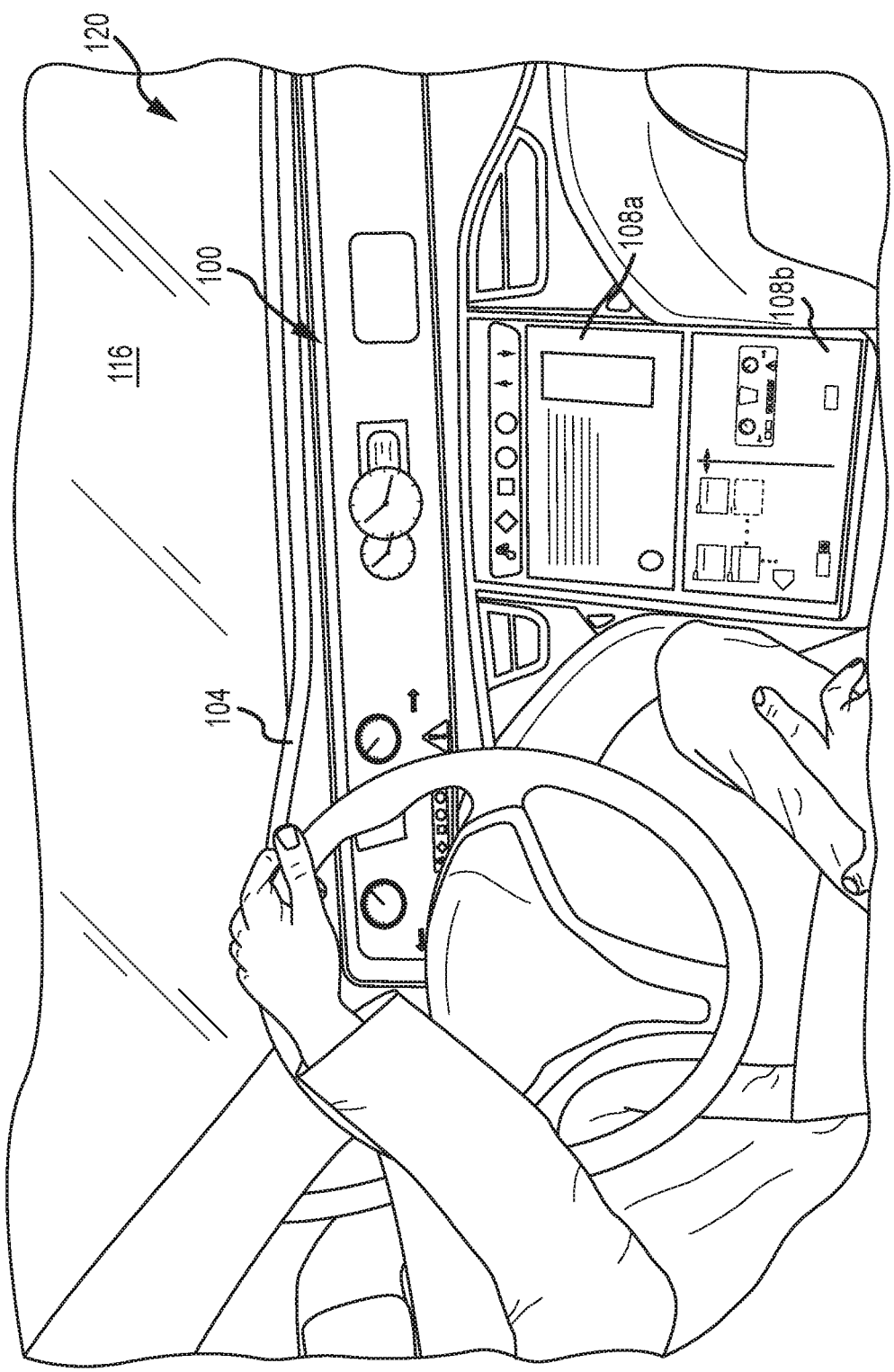
FIG. 1B depicts a second representation of a configurable dash display/cluster in a general viewing area of a vehicle in accordance with one embodiment of the present disclosure.

FIG. 1B depicts a second representation of a configurable dash display/cluster 100 in a general viewing area of a vehicle in accordance with one embodiment of the present disclosure. In particular, FIG. 1B shows the device 100 occupying a substantial portion of the vehicle dash 104. It is an aspect of the present disclosure that the device may occupy the entire space of the dash 104. The device 100 may be configured such that it is the dash 104 of a vehicle. As depicted, the device 100 may be accessible by one or more users (e.g., at least one operator, passenger, etc.). Input may be received at the device 100 from one or more users and/or signals simultaneously. For example, one user may be adjusting controls and configurations of the device that may be associated with one position of the vehicle, while another user may be manipulating controls and/or configurations associated with another position of the vehicle.

FIGS. 2A-2G depict multiple representations of a graphical user interface ("GUI") in accordance with embodiments of the present disclosure. In some embodiments, icons, applications, and/or the presentation layout may be modified via user input and/or automatically via a processor.

The configurable dash display, or device, 100 can include a number of devices that work separately or together with at least one process and/or signal of a vehicle to provide various input/output functions. One such device 100 includes a touch sensitive front screen 204. In some embodiments, the entire front surface of the front screen 204 may be touch sensitive and capable of receiving input by a user touching the front surface of the front screen 204. The front screen 204 includes touch sensitive display 208, which, in addition to being touch sensitive, also displays information to at least one user. In other embodiments, the screen 204 may include more than one display area.

It is anticipated that the device 100 may include a dual-screen phone and/or smartpad as described in respective U.S. patent application Ser. No. 13/222,921, filed Aug. 31, 2011, entitled "DESKTOP REVEAL EXPANSION," and Ser. No. 13/247,581, filed Sep. 28, 2011, entitled "SMARTPAD ORIENTATION." Each of the aforementioned documents is incorporated herein by this reference in their entirety for all that they teach and for all purposes.

In addition to touch sensing, front screen 204 may also include areas that receive input from a user without requiring the user to touch the display area of the screen. For example, the front screen 204 may be configured to display content to the touch sensitive display 208, while at least one other area may be configured to receive touch input via a gesture capture area 206. The front screen 204 includes at least one gesture capture area 206. This at least one gesture capture area 206 is able to receive input by recognizing gestures made by a user touching the gesture capture area surface of the front screen 204. In comparison to the touch sensitive display 208, the gesture capture area 206 is commonly not capable of rendering a displayed image.

In some embodiments, the device 100 may include one or more physical and/or electrical features such as switches, buttons, cameras, ports, slots, inputs, outputs, and the like. These features may be located on one or more surfaces of the device 100. In some embodiments, one or more of these features may be located adjacent to the device. It is an aspect of the present disclosure that the device 100 may communicate with and/or utilize one or more of these features that may be associated with other devices. For instance, the device 100 may communicate with another device (such as, at least one configurable vehicle console, smart-phone, tablet, and/or other computer) that has been associated with the vehicle to, among other things, utilize at least one feature of the other device. In this scenario, the device 100 may use the at least one other device as an extension to receive input and/or gather information.

In some embodiments, the device 100 includes a plurality of physical control buttons, which can be configured for specific inputs and, in response to receiving an input, may provide one or more electrical signals to a specific input pin of a processor or Integrated Circuit (IC) in the device 100. For example, the control buttons may be configured to, in combination or alone, control a number of aspects of the device 100. Some non-limiting examples include overall system power, volume, brightness, vibration, selection of displayed items, a camera, a microphone, and initiation/termination of device functions. In some embodiments, instead of separate buttons two buttons may be combined into a rocker button. This arrangement is useful in situations where the buttons are configured to control features such as volume or brightness. In other embodiments, a button may be configured to, in addition to or in lieu of controlling one function, control other aspects of the device 100. In some embodiments, one or more of the buttons may be capable of supporting different user commands. By way of example, a normal press has a duration commonly of less than about 1 second and resembles a quick tap. A medium press has a duration commonly of 1 second or more but less than about 12 seconds. A long press has a duration commonly of about 12 seconds or more. The function of the buttons is normally specific to the application that is currently in focus on the display 208. In an entertainment application for instance and depending on the particular button, a normal, medium, or long press can mean end playback, increase volume of media, decrease volume of media, and toggle volume mute. In a camera or video application for instance and depending on the particular button, a normal, medium, or long press can mean increase zoom, decrease zoom, and take photograph or record video.

In embodiments, the device 100 may also include a card/memory slot and/or a port. The card/memory slot, in embodiments, may be configured to accommodate different types of cards including a subscriber identity module (SIM) and/or other card based memory. The port in embodiments may be an input/output (I/O port) that allows the device 100 to be connected to other peripheral devices, such as a vehicle, phone, keyboard, other display, and/or printing device. As can be appreciated, these are merely some examples and in other embodiments the device 100 may include other slots and ports such as slots and ports for accommodating additional memory devices, facilitating firmware and/or software updates, and/or for connecting other peripheral devices.

The device 100 may make use of a number of hardware components. For instance the device 100 may include or be configured to communicate with a speaker and/or a microphone. The microphone may be used by the device 100 to receive audio input which may control and/or manipulate applications and/or features of the device 100. In embodiments, device 100 may utilize a camera and a light source, which may be used to control and/or manipulate applications and/or features of the device 100. It is anticipated that the device 100 may utilize one or more cameras, which can be mounted on any surface of the vehicle and/or may be resident to at least one associated device. In the event that the one or more cameras are used to detect user input, via gestures and/or facial expression, the one or more cameras may be located on the front screen 204.

It is an aspect of the present disclosure that the device 100 is capable of interfacing with one or more other devices, including a vehicle control system. These other devices may include additional displays, consoles, dashboards, associated vehicle processors, and the like. Vehicle and/or functional communications may be made between the device 100 and the vehicle via communications protocols. Communication may involve sending and receiving one or more signals between a vehicle and the device 100. The device 100 may be connected to at least one other device via a physical, inductive, and/or wireless association.

As can be appreciated, the description of the device 100 is made for illustrative purposes only, and the embodiments are not limited to the specific mechanical features shown in FIGS. 2A-2G and described above. In other embodiments, the device 100 may include additional features, including one or more additional buttons, slots, display areas, and/or shapes. Additionally, in embodiments, the features described above may be located in different parts of the device 100 and still provide similar functionality. Therefore, FIGS. 2A-2G and the description provided above are non-limiting.

Figure 2A:
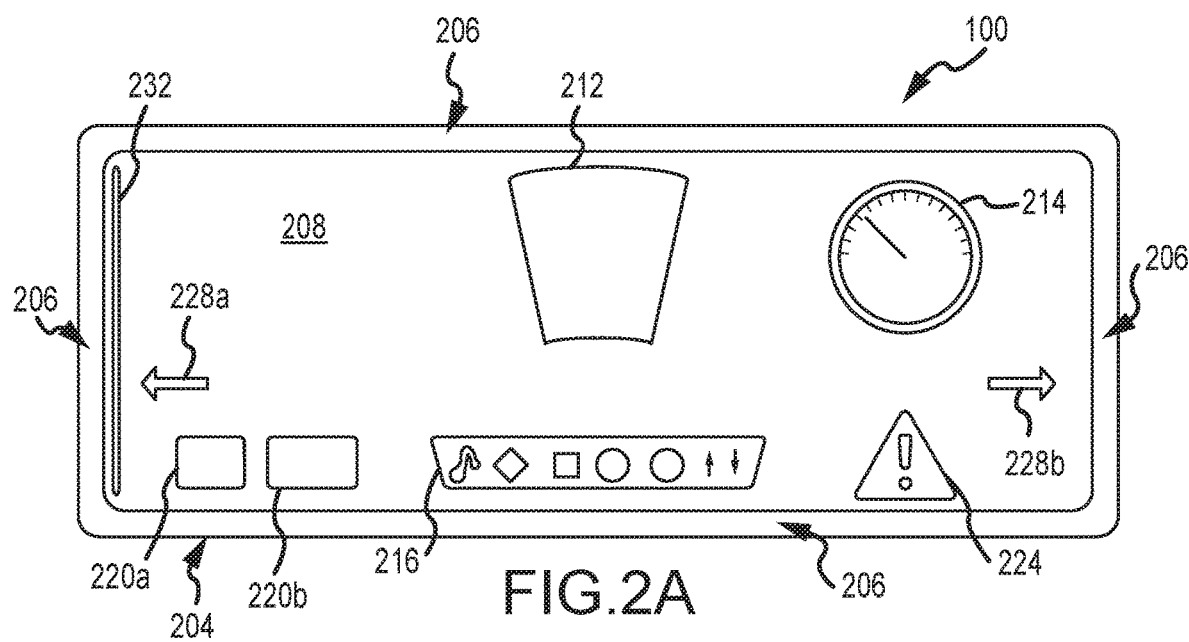
FIG. 2A depicts a first representation of a graphical user interface of a configurable dash display in accordance with one embodiment of the present disclosure.

Referring now to FIG. 2A, a first representation of a GUI of a configurable dash display is shown in accordance with one embodiment of the present disclosure. In embodiments, the device 100 is adapted to run and/or display one or more applications that are associated with at least one vehicle function. An application may be displayed onto the touch sensitive screen 204. Additionally or alternatively, the device 100 may run at least one application that is designed to monitor and/or control one or more functions of a vehicle. A number of applications may be available for display on the configurable dash display 100, which may include a computer 212, a gage 214, indicators and/or indicator panel 216, function buttons 220a, 220b, a warning indicator 224, turn signals 228a, 228b, and the like. In some embodiments, a user may add applications via an application tray that may be accessed by dragging a tray handle 232 from a side of the device 100. In some embodiments, the device 100 may receive input from a number of different sources, including physical, electrical, and/or audible commands. Input may be received at the device 100 through, but not limited to, the touch sensitive screen 204, a microphone, hardware buttons, ports, cameras, and combinations thereof.

Other vehicle applications and their corresponding functions may be run by the device 100, including entertainment applications (music, movies, etc.), trip computer applications (to display mileage traveled, miles per gallon fuel consumption, average speed, etc.), phone controls (especially hands-free phones associated with the vehicle), GPS, road conditions and warnings, and other applications useful to a vehicle operator or passenger. It is anticipated that vehicle applications may be purchased and/or managed via the Application Store 560.

The Application Store 560 may be similar to an application store for smart phones, mobile devices, and computers. It is anticipated that the present disclosure may use a communications channel or multiple channels available to the vehicle to make an application store purchase and/or download. Moreover, this purchase and download could be effected through the use of at least one individual's phone associated with the vehicle. In some embodiments, the application store may manage one or more applications remotely. This remote management may be achieved on the "cloud," possibly as part of a cloud-based storage medium.

It should be noted that the processing resources required for running, or at least displaying, applications on the device 100 may be split between processors that are associated with the device 100 and processors that are not associated with the device 100.

It is another aspect of the present disclosure that the GUI may include an application tray 240a. The application tray 240a may be configured to provide access to available dash display applications 236a, 236b, 236c. In addition, the application tray area 240 may display dash display applications available from an application store and/or provide a link to an application store via one or more icons 248. Whether applications have been installed, displayed, purchased, or are available for purchase via the application store icon 248, the various status of an application may be indicated in the application tray area 240a. For example, if an application is installed and displayed on the device 100, the application icon in the application tray 240a may appear differently from other icons that are not installed and displayed. In other words, if the icons are displayed in color to illustrate one or more state, they may appear in black and white, or grayscale, to indicate one or more other states. Therefore, given the previous example, available applications may have full color application icons, whereas installed and displayed icons may have grayscale icons. It is anticipated that various states of at least one application icon may be illustrated using various colors, intensities, transparencies, glows, shadows, and the like.

Figure 2B:
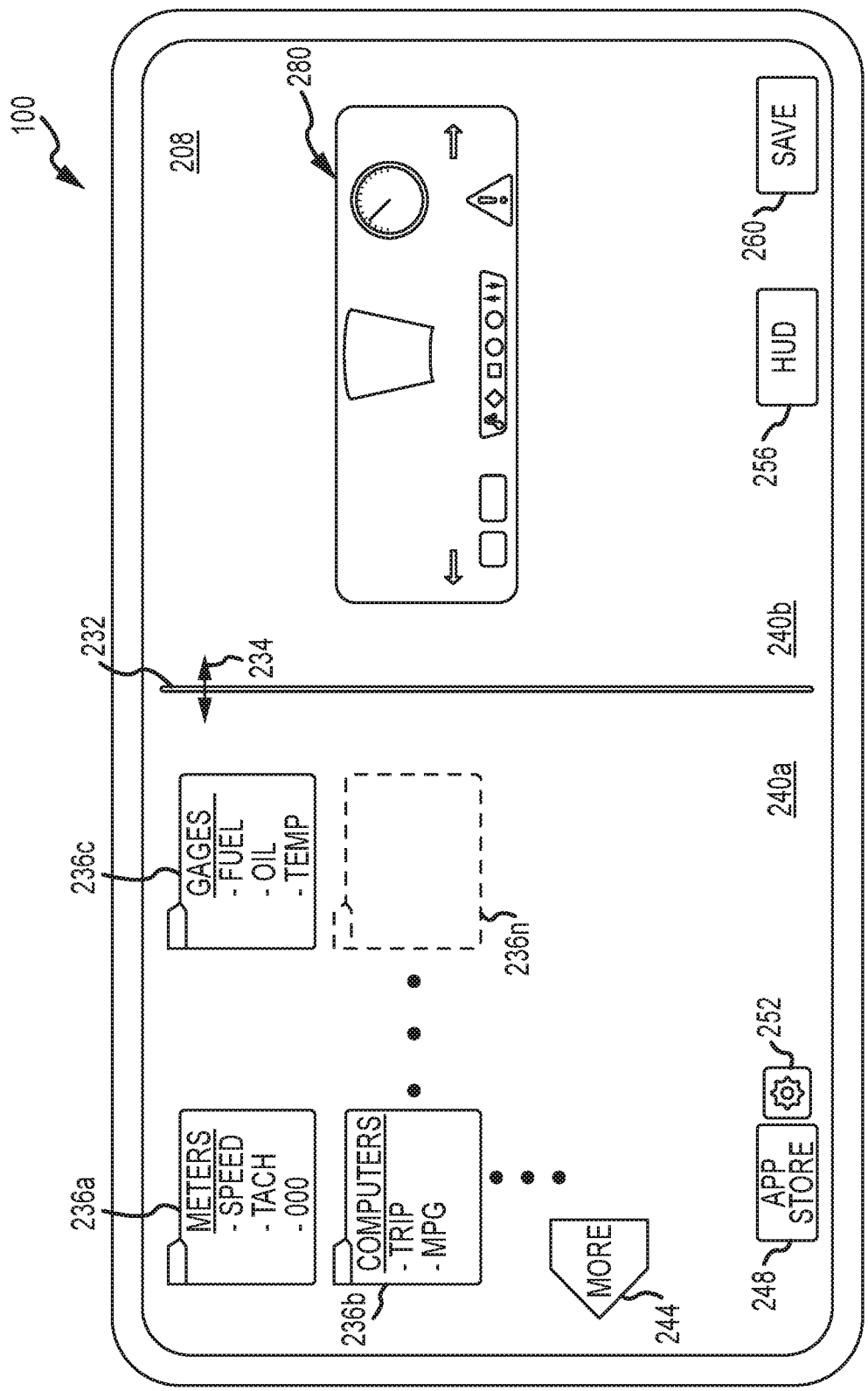
FIG. 2B depicts a second representation of a graphical user interface of a configurable dash display in accordance with one embodiment of the present disclosure.

FIG. 2B depicts a second representation of a GUI of a configurable dash display in accordance with one embodiment of the present disclosure. Specifically, the GUI shows the device display 208 separated into different areas. As shown, the device display 208 has been separated into two different areas represented as a tray area 240a and a configuration area 240b. In embodiments, the tray area 240a may be revealed by dragging a tray handle 232 in a direction 234 away from a side of the device display 208. Although shown as being accessed from the left side of the device display 208, it should be appreciated that the tray handle 232 and corresponding tray area 240a may be accessed from any area and/or side of the device display 208. The tray handle 232 may be dragged via input received by the device at one or more gesture capture area 206. Furthermore, the GUI may be separated into one or more different areas.

In some embodiments the application tray area 240a may be accessed by dragging a tray handle 232 or other feature to reveal the application tray area 240a. Other embodiments may use gesture recognition features of the touch sensitive display 208, gesture capture region 206, and/or associated hardware buttons to access the application tray area 240a. For instance, the tray area 240a may be revealed by a gesture drag on the display 208 using one or more fingers. In addition, the tray area 240a may be displayed in response to a predetermined state of the device 100. Revealing the application tray area 240a may be visually represented in a number of ways. Moreover, the effect that revealing the tray may have on displayed applications may also be represented in a number of ways. In some embodiments, the application tray area 240a may fly-out from a side of the device 100. In other embodiments the application tray area 240a may appear from a location of the display 208. The manner in which the tray area 240a transitions can be configured with regard to speed, color, transparency, audio output, and combinations thereof. In another embodiment, the application tray area 240a may be "pulled" in a direction 234 from a side of the device 100 to appear over displayed applications. In yet another embodiment, the application tray area 240a may be pulled from a side of the device 100 to share the display 208 with any displayed applications. This embodiment may require the resizing of displayed applications to provide adequate display area for the revealed tray area 240a. In one embodiment, as the tray area 240a increases in size, the displayed applications may decrease in size, and vice versa.

The tray area 240a may contain various items including but not limited to folders, menu structures, pictures, and/or other icons representative of one or more configurable dash display applications. The items displayed in the tray area 240a may reside in at least one local memory and/or reside in at least one remote memory location (e.g., the cloud). It is an aspect of the present disclosure that applications may be accessed, purchased, and/or sampled from at least one Application Store 560 via the App Store icon 248. The App Store icon 248 may reside in the tray area 240a. Once at least one application is chosen, purchased, and/or downloaded, it may be accessible from any number of folders 236a, 236b, 236c, . . . , 236n and/or as an icon displayed to the GUI. Navigation through various menu structures and/or access to additional features may be made via one or more menu function icons 244.

The tray area 240a and/or the configuration area 240b of the GUI may include one or more user-activated buttons, including but not limited to, a preferences icon 252, Heads-Up Display ("HUD") icon 256, and a save icon 260. In some embodiments, the preferences icon 252 may be used to alter the manner in which content is presented to the device display 208. The HUD icon 256 may be used to change the configuration display screen 280 and/or display the configured dash display onto a HUD. The HUD may employ various methods and light sources to display the configurable dash display to one or more users, including but not limited to, projection, Cathode Ray Tube ("CRT"), Light Emitting Diode ("LED"), Liquid Crystal Display ("LCD"), Organic Light Emitting Diode ("OLED"), and the like. The save icon 260 may be used to save one or more of the configured dash displays. Each configuration may be associated with one or more users. The HUD configuration may be saved via the save icon 260. In some embodiments, the functions associated with the user-activated buttons may be accessed automatically and/or in response to at least one signal sent by a processor.

The configuration area 240b of the GUI may contain various items including but not limited to folders, menu structures, pictures, and/or other icons representative of one or more configurable dash display applications. For example, the configuration area 240b may show a configuration display screen 280. This configuration display screen 260 represents the arranged GUI of the device which may be configured in this area of the device screen 208. It is one aspect of the present disclosure that applications from the tray area 240a may be dragged and dropped into place on the configuration area 240b of the device screen 208. Once inside the configuration area 240b each application may be adjusted according to desired user specifications. Various configurations represented by the configuration display screen 280 may be saved by initiating a save function through a save icon 260.

Figure 2C:
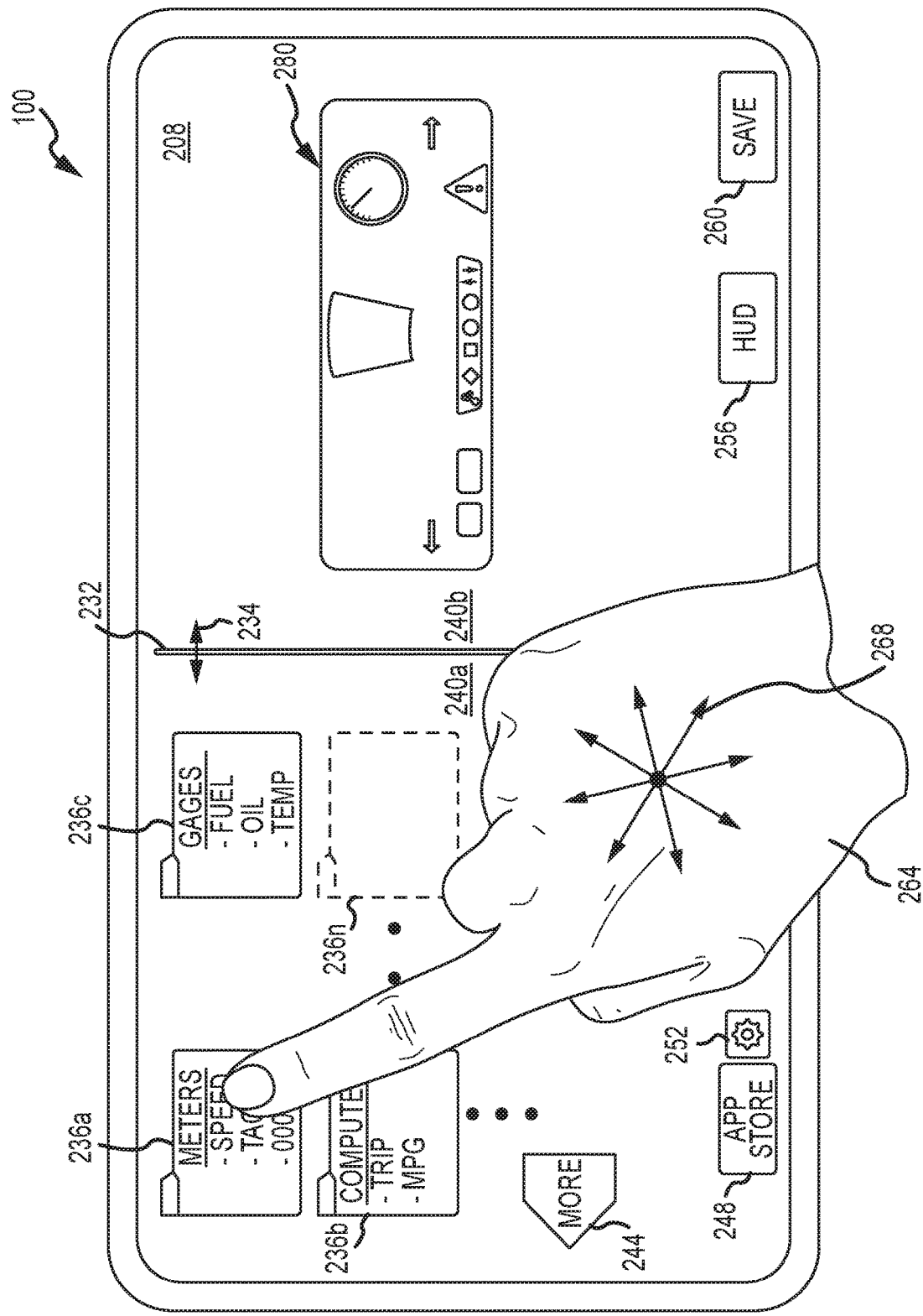
FIG. 2C depicts a third representation of a graphical user interface of a configurable dash display in accordance with one embodiment of the present disclosure.

FIG. 2C depicts a third representation of a graphical user interface of a configurable dash display in accordance with one embodiment of the present disclosure. In particular, a user 264 is accessing an application from a menu structure 236a in the tray area 240a. The user may select one or more applications from any menu structure, or combination of menu structures, and drag the application around the GUI in any direction 268. For example a user may wish to select a new gage from the meters folder 236a and drag it to the configuration area 240b for deployment in the configuration display screen 280 and even be displayed in the configurable dash display GUI.

Referring now to FIG. 2D a fourth representation of a graphical user interface of a configurable dash display in accordance with one embodiment of the present disclosure is shown. As shown, a user 264 has dragged a meter application 218 in a direction 272 that crosses the tray area 240a and configuration area 240b separator, the tray handle 232. The meter application may have been chosen from a folder 236a in the tray area 240a to be dropped in the configuration display screen 280 of the configuration area 240b. It is an aspect of the present disclosure that one or more applications may be dragged between the tray area 240a and the configuration area 240b, and vice versa. The applications may be dragged from one area to be dropped in another and/or dragged and dropped within the same area. The behavior of a dropped application may change if the area from which it was dragged differs from the area to which it is dropped. For instance, an application may be dragged from the tray area 240a to be dropped in the configuration area 240b. In this case, the application behavior on this type of drag may be configured to add the application to the configuration area and/or the configuration display screen 280. In contrast, the same application may be dragged from the configuration area 240b to be dropped in the tray area 240a. In this scenario, the behavior of the application may be configured to delete the application from the configuration area 240b once it is "dropped" in the tray area 240a. In this scenario, it is not necessary that the application be added to the tray area 240a. This application behavior may be configured to be interchangeable between areas and/or configured to be similar between areas.

Figure 2E:
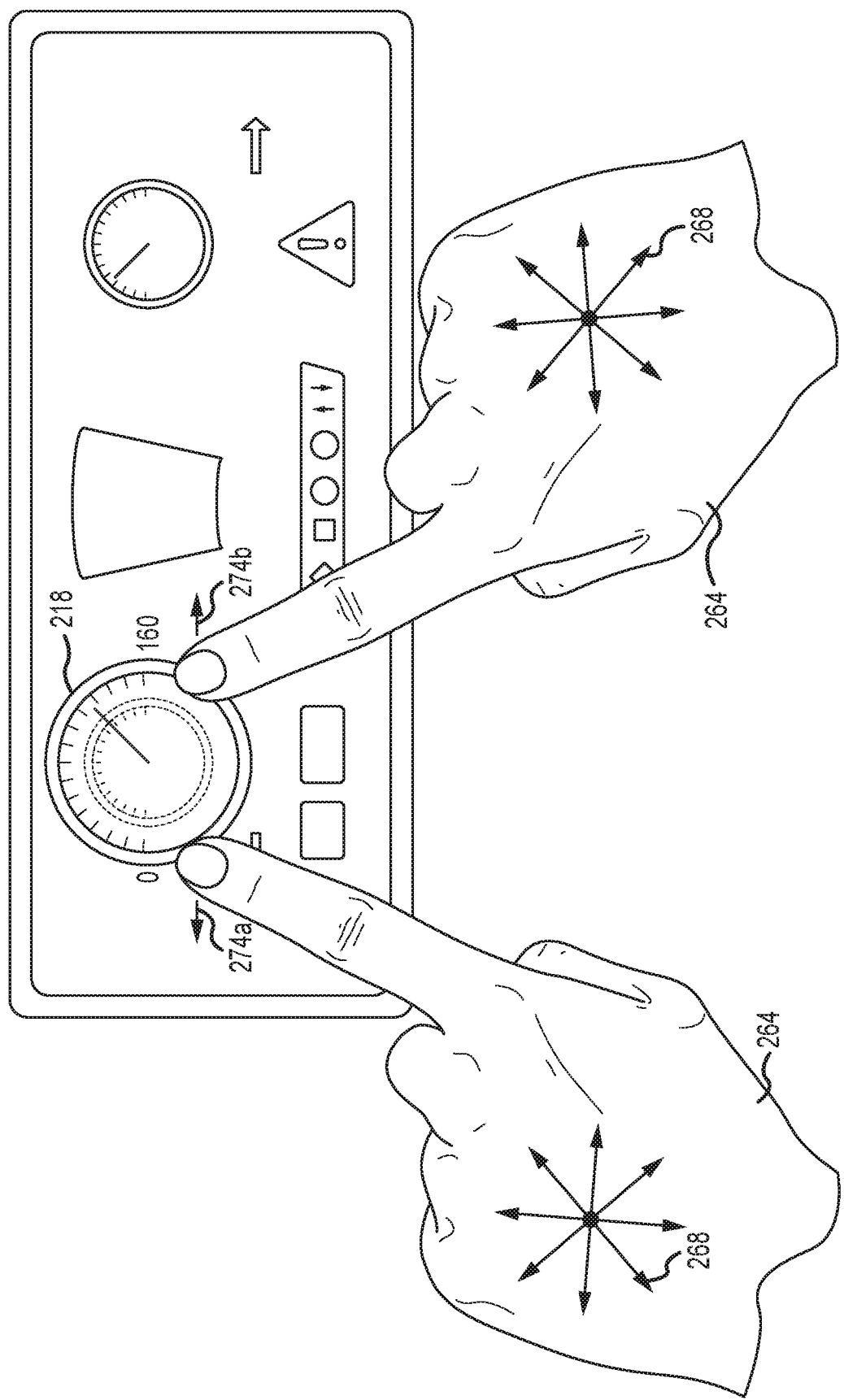
FIG. 2E depicts a fifth representation of a graphical user interface of a configurable dash display in accordance with one embodiment of the present disclosure.

FIG. 2E depicts a fifth representation of a graphical user interface of a configurable dash display in accordance with one embodiment of the present disclosure. In general, the display of an application is shown being altered by at least one user 264. In accordance with the present disclosure, applications may be altered to display in a number of different ways. Applications may be altered from the configuration display screen 280, upper console 108a, lower console 108b, alternate associated device, and/or from the configurable dash display GUI. For example, a gage, or simulated-analog speedometer, 218 may be adjusted for size. The size may be changed to suit the desires of a user or accommodate a GUI configuration. For example, FIG. 2E shows a simulated-analog speedometer gage 218 being resized via the input of a user 264. In this example, a user has touched different points of the gage 218 with each finger and is dragging the gage 218 points away from each other in different directions 274a, 274b. Dragging the gage 218 apart, as shown, may be configured to increase the size of a gage 218. As may be expected, the operation can be reversed, that is by dragging two points of the gage 218 closer together. This closer moving drag may be employed to decrease the size of a gage 218. Some benefits of resizing and/or altering the appearance of gages 218 include, but are not limited to, accommodating near-sighted handicaps, adjusting the overall aesthetic of the GUI, and placing emphasis on one or more gages 218. In some instances, several gages, or applications, may be preconfigured for size and appearance and saved as custom layouts. Although preconfigured, the components that comprise the custom layouts may be altered as described herein.

Figure 2F:
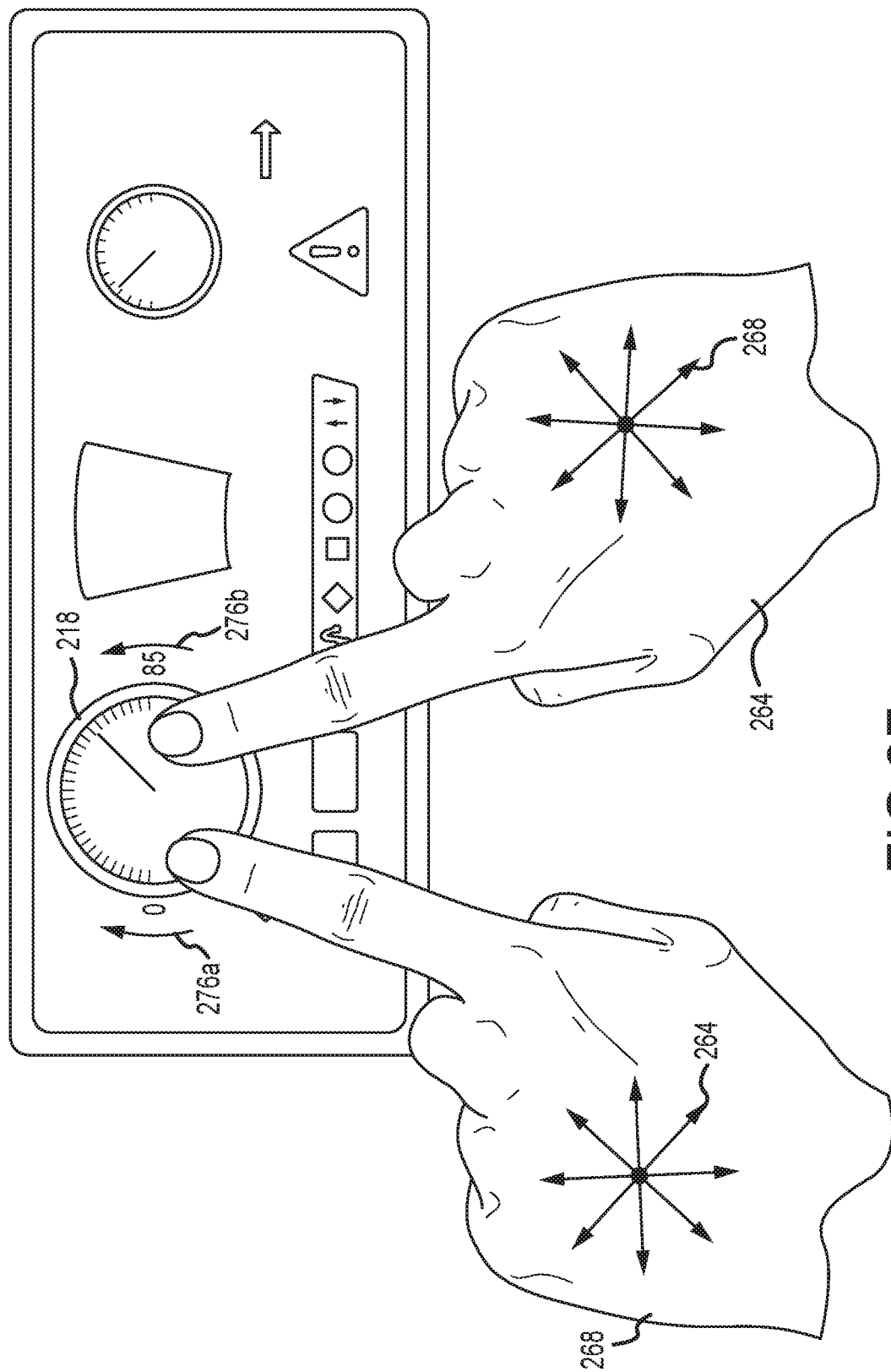
FIG. 2F depicts a sixth representation of a graphical user interface of a configurable dash display in accordance with one embodiment of the present disclosure.

FIG. 2F depicts a sixth representation of a graphical user interface of a configurable dash display in accordance with one embodiment of the present disclosure. In general, another display of an application is shown being altered by at least one user 264. As described above, applications may be altered to display in a number of different ways. These applications may be altered from the configuration display screen 280 and/or from the GUI. FIG. 2F shows a user altering the scale of a simulated-analog speedometer gage 218. Specifically, a gage 218 like a simulated-analog speedometer may be installed with preset upper limits. For instance, most vehicles may display an upper limit on a speedometer that may not be attainable by the vehicle. In this example, it may be desired to increase the accuracy of an analog or simulated-analog gage by decreasing the upper limit to a reasonable and/or attainable number. Because the size of the gage 218 may be held constant, while the original upper limit is reduced the original distances between speeds may be increased in response. This scale change results in an increase in displayed accuracy. It is anticipated that this procedure may be reversed to set higher upper limits.

Additionally or alternatively, the units of measurement displayed by an application may be modified and/or changed to display in a number of given measurement systems. For example, a user may purchase a vehicle in a metric measurement country, and as such, the vehicle may display kilometers per hour (kph) on a simulated analog gage application, possibly as a "default" or user-programmed setting. In the event that the purchaser wishes to enter to an imperial measurement country, the simulated analog gage application may be modified to display in miles per hour (mph). It is anticipated that the simulated analog gages and other application may display any range of units in accordance with known and/or programmed measurement systems. The vehicle may automatically set scales, units, and/or adjust the gage 218 in response to a specific input. For instance, once the vehicle reaches a speed not displayed, or approaches the upper display limit, the scale may change to accommodate the new speeds. An alert may be presented to indicate a change to the display of one or more applications.

FIG. 2G depicts a seventh representation of a GUI of a configurable dash display in accordance with one embodiment of the present disclosure. In some instances, the GUI may show a warning, message, and/or application output that utilizes all, or a substantial portion, of the display 208. Although applications may utilize a portion of the display 208 and even be configured for functionality and aesthetics, it is anticipated that certain features may be considered more important than others, especially in the event of an emergency. Therefore, it may be desired to display important information to the display 208 over, or in place of, other applications. For example, in the event of an accident, the vehicle may associate a number of warnings and/or messages to the event. In some cases, these warnings and/or messages may be important for the at least one vehicle operator and/or passenger to review and even respond to. As shown in FIG. 2G, a warning message, indicator, and/or cue image 224 may be presented to the display 208 by the device 100. This information may be presented in response to input detected by the device 100, through GPS, gyroscopic, and/or accelerometer data. Additionally or alternatively, the information may be presented in response to the device 100 detecting input received from the vehicle and/or at least one peripheral device associated with the vehicle.

The information (warnings, messages, cues, and the like) may be displayed permanently, semi-permanently, or temporarily depending on predetermined settings and/or legal requirements. Permanently displayed information may be shown if an individual has attempted to modify the device 100 or alter specific vehicle systems without authorization. Information of this type may also be displayed permanently if the vehicle and/or the device 100 detects a condition that warrants the permanent display of information, such as a catastrophic engine failure, a dangerous operating condition, and/or other similar conditions. Semi-permanent displayed information may be shown on display 208 until reset via an authorized method. For instance, if the vehicle requires maintenance, a semi-permanent image may be displayed until the maintenance has been received and the semi-permanent image is removed. It is anticipated that the removal of semi-permanent images may be made by authorized personnel. Authorized personnel may make use of special input, and/or devices to remove/reset the image from the display 208.

In some embodiments, one or more images 224 (associated with warnings, messages, cues, and the like) may appear on the display 208, which may even be followed by directions, recommendations, and/or controls. Continuing the previous example, if a vehicle is involved in an emergency event (such as an accident), a warning image may be displayed followed by directions and access to specific vehicle controls. The displayed image 224 may be shown above other applications that are displayed on the device 100. Additionally or alternatively, the displayed image 224 may replace other applications and/or displayed information previously shown on the display 208. In embodiments, warnings and/or warning images may appear on more than one screen, display, and/or device associated with the device 100.

Figure 3A:
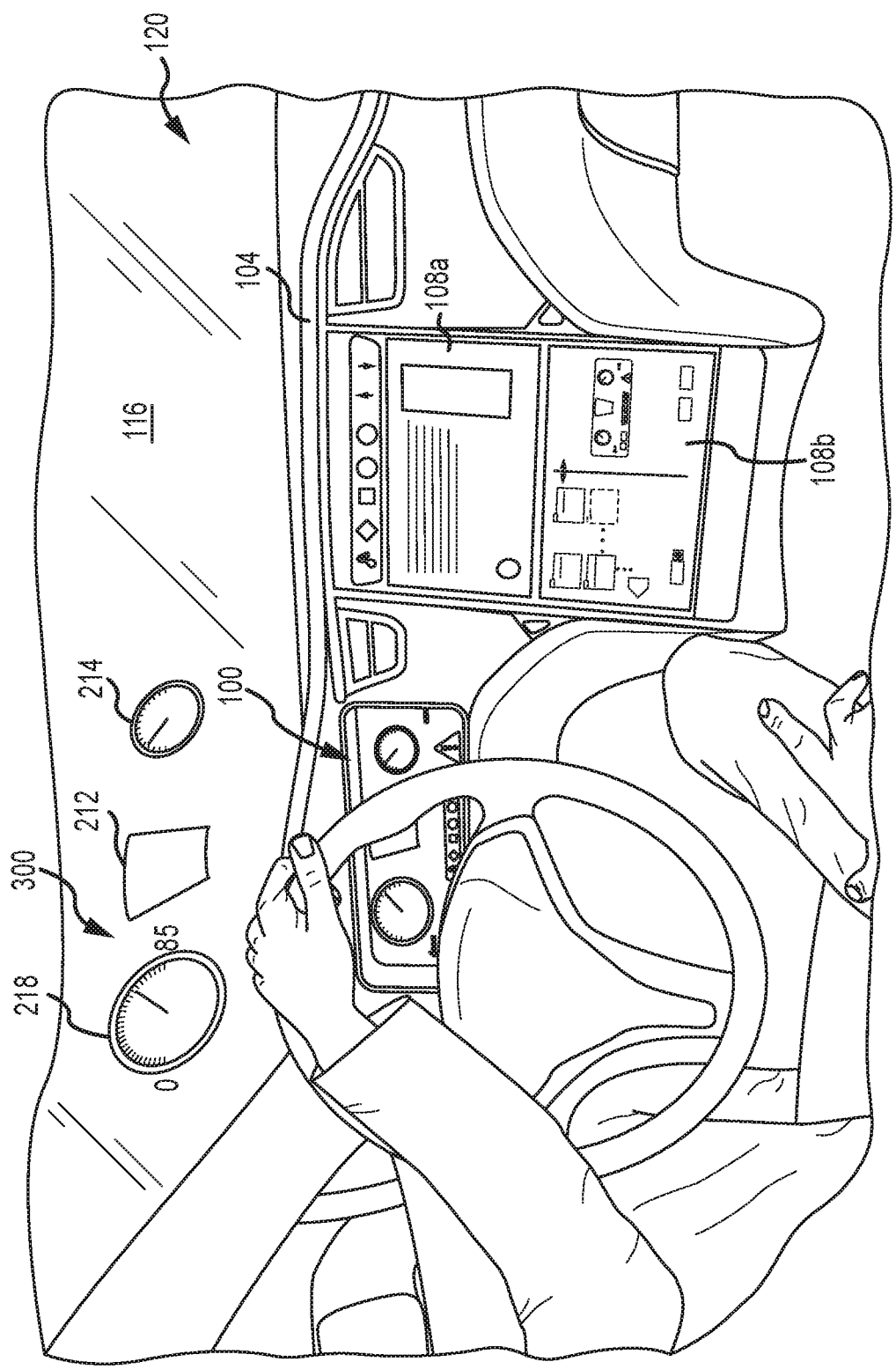
FIG. 3A depicts a first representation of a configurable heads-up dash display/cluster in a general viewing area of a vehicle in accordance with one embodiment of the present disclosure.

FIG. 3A depicts a first representation of a configurable heads-up dash display/cluster in a general viewing area of a vehicle 120 in accordance with one embodiment of the present disclosure. In some embodiments, the configurable heads-up dash display, HUD, may span across one or more displays, surfaces, windows, glasses, and/or reflective medium. As depicted, at least one HUD device 300 may occupy at least one area of a vehicle 120. These at least one areas may be located on or adjacent to the dash 104 of a vehicle 120. It is an aspect of the present disclosure that the configurable heads-up dash display may be located such that one or more individuals associated with a vehicle 120 can interact with and/or observe the configurable HUD 300. The HUD device 300 may comprise a screen, a projection unit, light-emitting unit, and Graphical User Interface, and/or hardware switches or buttons.

It is anticipated that the HUD device 300 may communicate with, and/or be operated independently of, one or more dash displays 100 and/or console displays 108*a*, 108*b*. Communication between the device 300, a dash display 100, and/or at least one additional console display 108*a*, 108*b* may be achieved through physical and/or wireless methods. It is one aspect of the present disclosure that the HUD device 300 may be configured at the dash display device 100 and/or by at least one console display 108*a*, 108*b*. For example, a user (e.g., a passenger) may wish to configure settings that are associated with the user while the vehicle is being operated by another. In this example, the user could safely arrange and/or configure a HUD display 300 for at least one of an operating condition and non-operating condition. The user may then save the configuration and/or arrangement in a memory location that may be associated with at least one user of the vehicle.

Similar, if not identical, to the GUI described above in FIGS. 2A-2G, the HUD device may display applications in any number of configurations. It is anticipated that the applications and/or layout of the GUI may be arranged as described above for the GUI of the dash display device 100. Essentially, the HUD device 300 may display content in similar layouts to the dash display device 100 and/or behave as the dash display device 100. Furthermore, the HUD device 300 may be configured as is described for the dash display device 100 above. This configurability may even include the ability to alter the appearance and/or functionality of gages, applications, and the like.

Figure 3B:
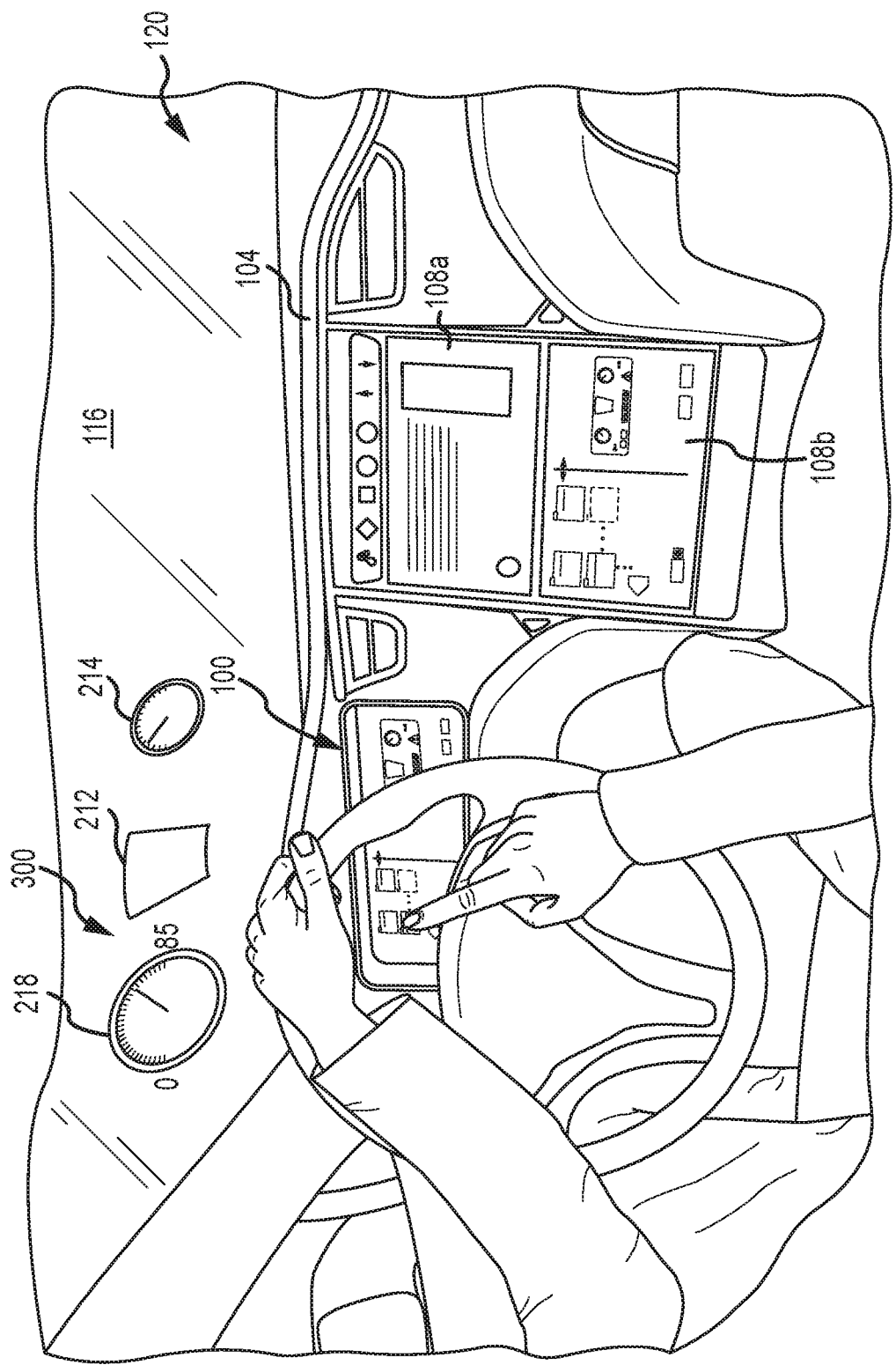
FIG. 3B depicts a second representation of a configurable heads-up dash display/cluster in a general viewing area of a vehicle in accordance with one embodiment of the present disclosure.

FIG. 3B depicts a second representation of a configurable heads-up dash display/cluster 300 in a general viewing area of a vehicle 120 in accordance with one embodiment of the present disclosure. In particular, FIG. 3B shows the HUD device 300 being configured by a user at the dash display device 100. It is an aspect of the present disclosure that the HUD device 300 may occupy a substantial portion of the view of a user in the vehicle 120. The HUD device 100 may be configured such that it spans across and/or above most of the dash 104 of a vehicle 120. As depicted, the HUD device 300 may be accessible by one or more users (e.g., at least one operator, passenger, etc.). Input may be received by the HUD device 300 from one or more users and/or signals simultaneously. For example, one user may be adjusting controls and configurations of the HUD device 300 that may be associated with one position of the vehicle 120, while another user may be manipulating controls and/or configurations associated with another position of the vehicle 120.

Figure 3C:
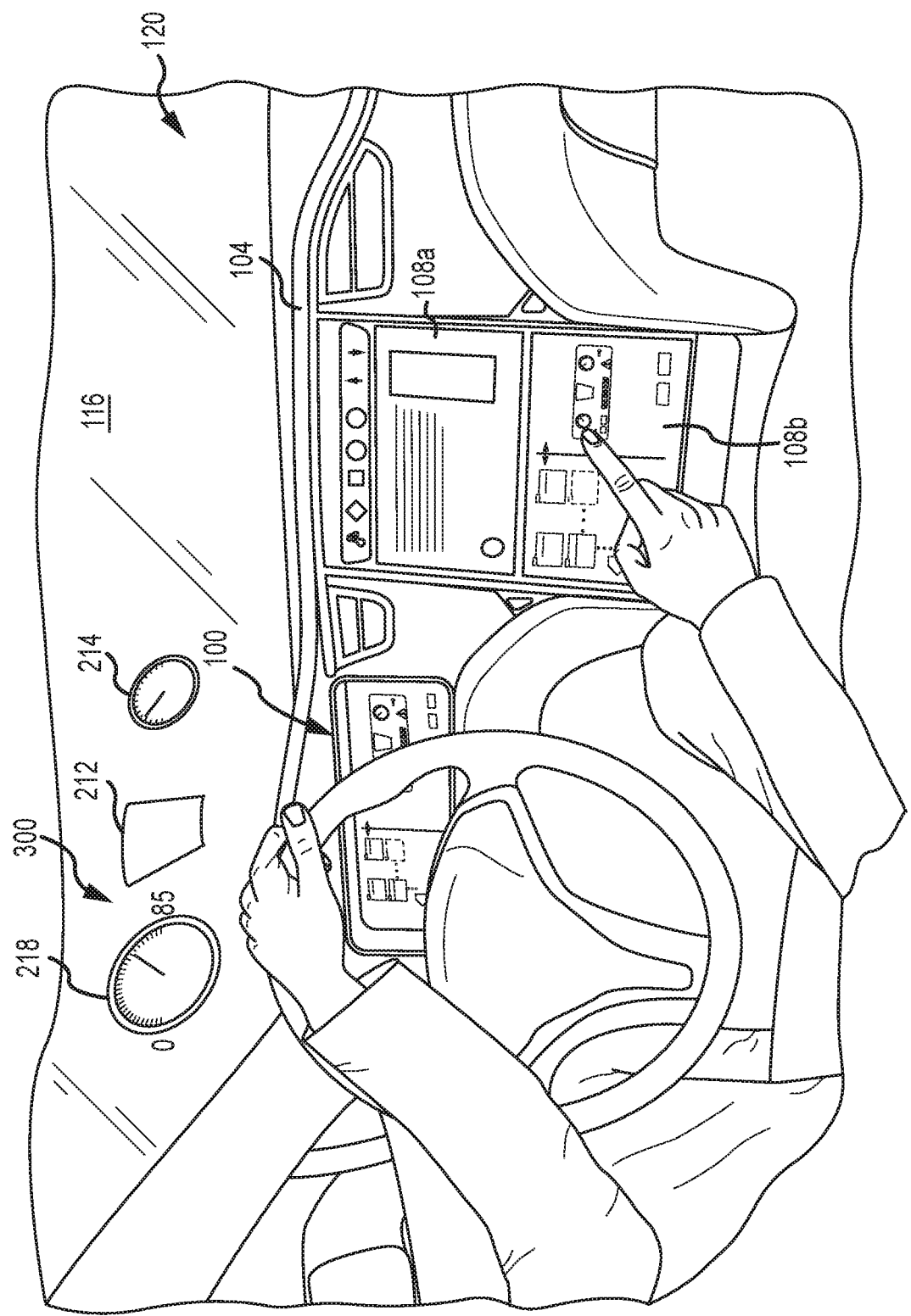
FIG. 3C depicts a third representation of a configurable heads-up dash display/cluster in a general viewing area of a vehicle in accordance with one embodiment of the present disclosure.

FIG. 3C depicts a third representation of a configurable heads-up dash display/cluster in a general viewing area of a vehicle 120 in accordance with one embodiment of the present disclosure. In particular, FIG. 3C shows the HUD device 300 being configured by a user at one of the vehicle console displays 108*b*. During the configuration of the HUD device via at least one of the console displays 108*a*, 108*b*, a configuration display screen 280 may be shown in part of or substantially most of a console display 108*a*, 108*b* GUI.

Figure 3D:
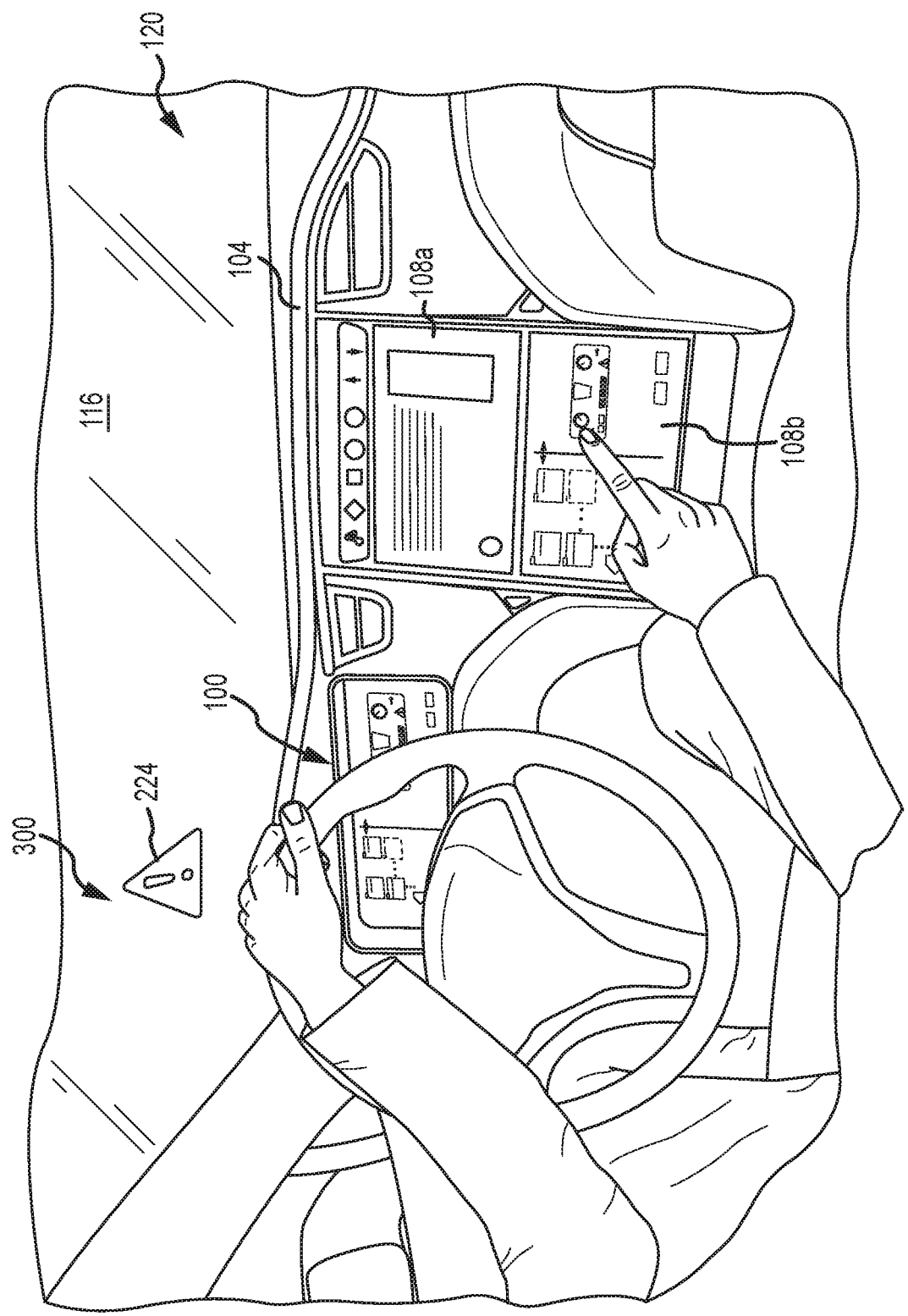
FIG. 3D depicts a fourth representation of a configurable heads-up dash display/cluster in a general viewing area of a vehicle in accordance with one embodiment of the present disclosure.

FIG. 3D depicts a fourth representation of a configurable heads-up dash display/cluster in a general viewing area of a vehicle 120 in accordance with one embodiment of the present disclosure. In particular, the HUD device 300 is displaying a warning indicator, message, and/or cue image 224. The warning indicator 224 may behave, be configured, and/or be displayed as described above, specifically with respect to FIG. 2G. All of the aforementioned applications, images, and behaviors may be modified as required by law and/or rules.

Figure 4:
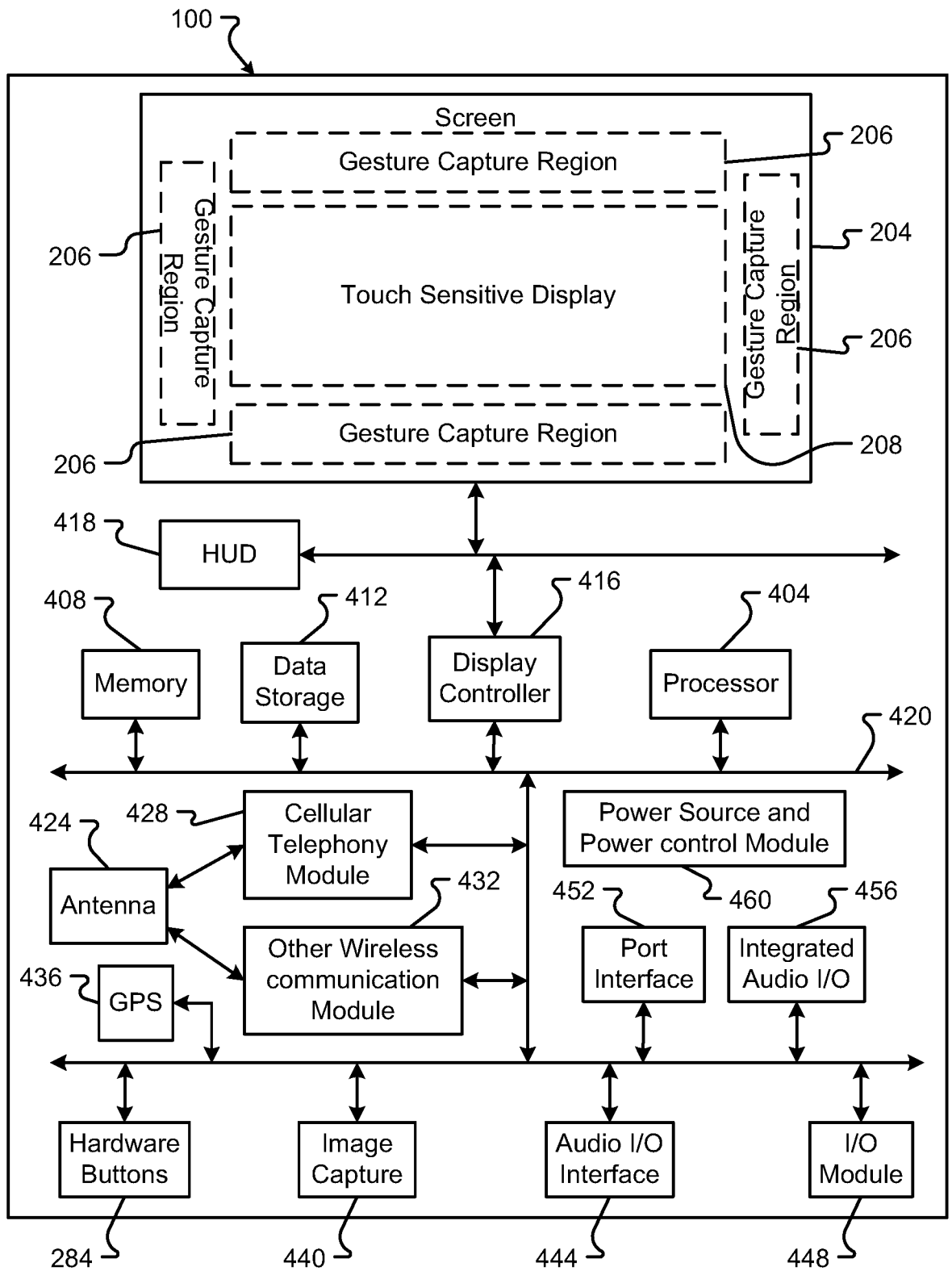
FIG. 4 is a block diagram of an embodiment of the hardware of the device.

FIG. 4 is a block diagram of an embodiment of the hardware of the device. In general, the device 100 includes a front screen 204 with a touch sensitive display 208. The front screen 204 may be disabled and/or enabled by a suitable command. Moreover, the front screen 204 can be touch sensitive and can include different operative areas. For example, a first operative area, within the touch sensitive screen 204, may comprise a touch sensitive display 208. In general, the touch sensitive display 208 may comprise a full color, touch sensitive display. A second area within each touch sensitive screen 204 may comprise a gesture capture region 206. The gesture capture region 206 may comprise one or more area or region that is outside of the touch sensitive display 208 area, and that is capable of receiving input, for example in the form of gestures provided by a user. However, the one or more gesture capture regions 206 do not include pixels that can perform a display function or capability.

In one embodiment, a system or method for reconfiguring (dynamically) a vehicle display may comprise: a Graphical User Interface ("GUI") including a first display area; an input gesture area of the first display area; a HUD unit; a non-transitory computer readable medium having instructions stored thereon that, when executed by a processor, configure the system to: (1) display, at a first time, a configuration area to a portion of the GUI, wherein the configuration area includes at least one of a vehicle dash information, readouts, instruments, indicators, or controls arranged as a visual representation of a virtual dash display for the HUD unit; (2) receive a gesture input at the GUI, wherein the gesture input corresponds to an instruction to reconfigure at least one of a layout, size, position, features, instruments, indicators, color schemes, or controls for display on at least one of an above a vehicle dash by the HUD unit, a reconfigurable dash display, a reconfigurable console display, or a reconfigurable user device display; and wherein the gesture input is at least one of hand gesture or touch gesture received through at least one of a gesture capture region or image capture disposed on at least one of a dash, console, dash display, or console display. Gesture input may include at least one of touch gesture or hand gesture. In the case of a touch gesture, the gesture capture region may be configured to receive touch gesture input for reconfiguring the display output. In other embodiments, an image or video capture disposed on a dash, console, dash display, or console display may be configured to receive a hand gesture or "gesture in the air" to be processed to reconfigure any one of a display outcome. For instance, the driver may make a swipe left gesture to remove the low air pressure indicator from the display to make more display room for the sat-nav map. Other gestures parallel to the touch screen gestures may be used to effectuate the same display outcomes (separating the pinched thumb from index finger may effectuate an enlarging of the displayed item, for instance).

It is further anticipated that a third region of the touch sensitive screen 204 may comprise one or more configurable areas. The configurable area is capable of receiving input and has display or limited display capabilities. As can be appreciated, the configurable area may occupy any part of the touch sensitive screen 204 not allocated to a gesture capture region 206 or touch sensitive display 208. In embodiments, the configurable area may present different input options to the user. For example, the configurable area may display buttons or other relatable items. Moreover, the identity of displayed buttons, or whether any buttons are displayed at all within the configurable area of the touch sensitive screen 204 may be determined from the context in which the device 100 is used and/or operated. In an exemplary embodiment, the touch sensitive screen 204 comprises liquid crystal display devices extending across at least the region of the touch sensitive screen 204 that is capable of providing visual output to a user, and a resistive and/or capacitive input matrix over the regions of the touch sensitive screen 204 that are capable of receiving input from the user.

One or more display controllers 416 may be provided for controlling the operation of the touch sensitive screen 204, including input (touch sensing) and output (display) functions. In the exemplary embodiment illustrated in FIG. 4, a touch screen controller 416 is provided for the touch screen 204 and/or a HUD 418. In accordance with some embodiments, the functions of a touch screen controller 416 may be incorporated into other components, such as a processor 404.

The processor 404 may comprise a general purpose programmable processor or controller for executing application programming or instructions. In accordance with at least some embodiments, the processor 404 may include multiple processor cores, and/or implement multiple virtual processors. In accordance with still other embodiments, the processor 404 may include multiple physical processors. As a particular example, the processor 404 may comprise a specially configured application specific integrated circuit (ASIC) or other integrated circuit, a digital signal processor, a controller, a hardwired electronic or logic circuit, a programmable logic device or gate array, a special purpose computer, or the like. The processor 404 generally functions to run programming code or instructions implementing various functions of the device 100.

A device 100 may also include memory 408 for use in connection with the execution of application programming or instructions by the processor 404, and for the temporary or long term storage of program instructions and/or data. As examples, the memory 408 may comprise RAM, DRAM, SDRAM, or other solid state memory. Alternatively or in addition, data storage 412 may be provided. Like the memory 408, the data storage 412 may comprise a solid state memory device or devices. Alternatively or in addition, the data storage 412 may comprise a hard disk drive or other random access memory.

In support of communications functions or capabilities, the device 100 can include a cellular telephony module 428. As examples, the cellular telephony module 428 can comprise a GSM, CDMA, FDMA and/or analog cellular telephony transceiver capable of supporting voice, multimedia and/or data transfers over a cellular network. Alternatively or in addition, the device 100 can include an additional or other wireless communications module 432. As examples, the other wireless communications module 432 can comprise a Wi-Fi, BLUETOOTH™, WiMax, infrared, or other wireless communications link. The cellular telephony module 428 and the other wireless communications module 432 can each be associated with a shared or a dedicated antenna 424.

A port interface 452 may be included. The port interface 452 may include proprietary or universal ports to support the interconnection of the device 100 to other devices or components, such as a dock, which may or may not include additional or different capabilities from those integral to the device 100. In addition to supporting an exchange of communication signals between the device 100 and another device or component, the docking port 244 and/or port interface 452 can support the supply of power to or from the device 100. The port interface 452 also comprises an intelligent element that comprises a docking module for controlling communications or other interactions between the device 100 and a connected device or component.

An input/output module 448 and associated ports may be included to support communications over wired networks or links, for example with other communication devices, server devices, and/or peripheral devices. Examples of an input/output module 248 include an Ethernet port, a Universal Serial Bus (USB) port, Institute of Electrical and Electronics Engineers (IEEE) 1394, or other interface.

An audio input/output interface/device(s) 444 can be included to provide analog audio to an interconnected speaker or other device, and to receive analog audio input from a connected microphone or other device. As an example, the audio input/output interface/device(s) 444 may comprise an associated amplifier and analog to digital converter. Alternatively or in addition, the device 100 can include an integrated audio input/output device 456 and/or an audio jack for interconnecting an external speaker or microphone. For example, an integrated speaker and an integrated microphone can be provided, to support near talk or speaker phone operations.

Hardware buttons can be included for example for use in connection with certain control operations. Examples include a master power switch, volume control, etc., as described herein. One or more image capture interfaces/devices 440, such as a camera, can be included for capturing still and/or video images. Alternatively or in addition, an image capture interface/device 440 can include a scanner or code reader. An image capture interface/device 440 can include or be associated with additional elements, such as a flash or other light source.

The device 100 can also include a global positioning system (GPS) receiver 436. In accordance with embodiments of the present invention, the GPS receiver 436 may further comprise a GPS module that is capable of providing absolute location information to other components of the device 100. An accelerometer(s)/gyroscope(s) 256 may also be included. For example, in connection with the display of information to a user and/or other functions, a signal from the accelerometer/gyroscope 256 can be used to determine an orientation and/or format in which to display that information to the user. In some embodiments, the accelerometer/gyroscope 256 may comprise at least one accelerometer and at least one gyroscope.

Embodiments of the present invention can also include one or more magnetic sensing feature 252. The magnetic sensing feature 252 can be configured to provide a signal indicating the position of the device relative to a vehicle-mounted position. This information can be provided as an input, for example to a user interface application, to determine an operating mode, characteristics of the touch sensitive display 208 and/or other device 100 operations. As examples, a magnetic sensing feature 252 can comprise one or more of Hall-effect sensors, a multiple position switch, an optical switch, a Wheatstone bridge, a potentiometer, or other arrangement capable of providing a signal indicating of multiple relative positions the touch screens are in. Alternatively, the magnetic sensing feature 252 may comprise one or more metallic elements used by other sensors associated with the console and/or vehicle to determine whether the device 100 is in a vehicle-mounted position. These metallic elements may include but are not limited to rare-earth magnets, electromagnets, ferrite and/or ferrite alloys, and/or other material capable of being detected by a range of sensors.

Communications between various components of the device 100 can be carried by one or more buses 420. In addition, power can be supplied to the components of the device 100 from a power source and/or power control module 460. The power control module 460 can, for example, include a battery, an AC to DC converter, power control logic, and/or ports for interconnecting the device 100 to an external source of power.

Figure 5:
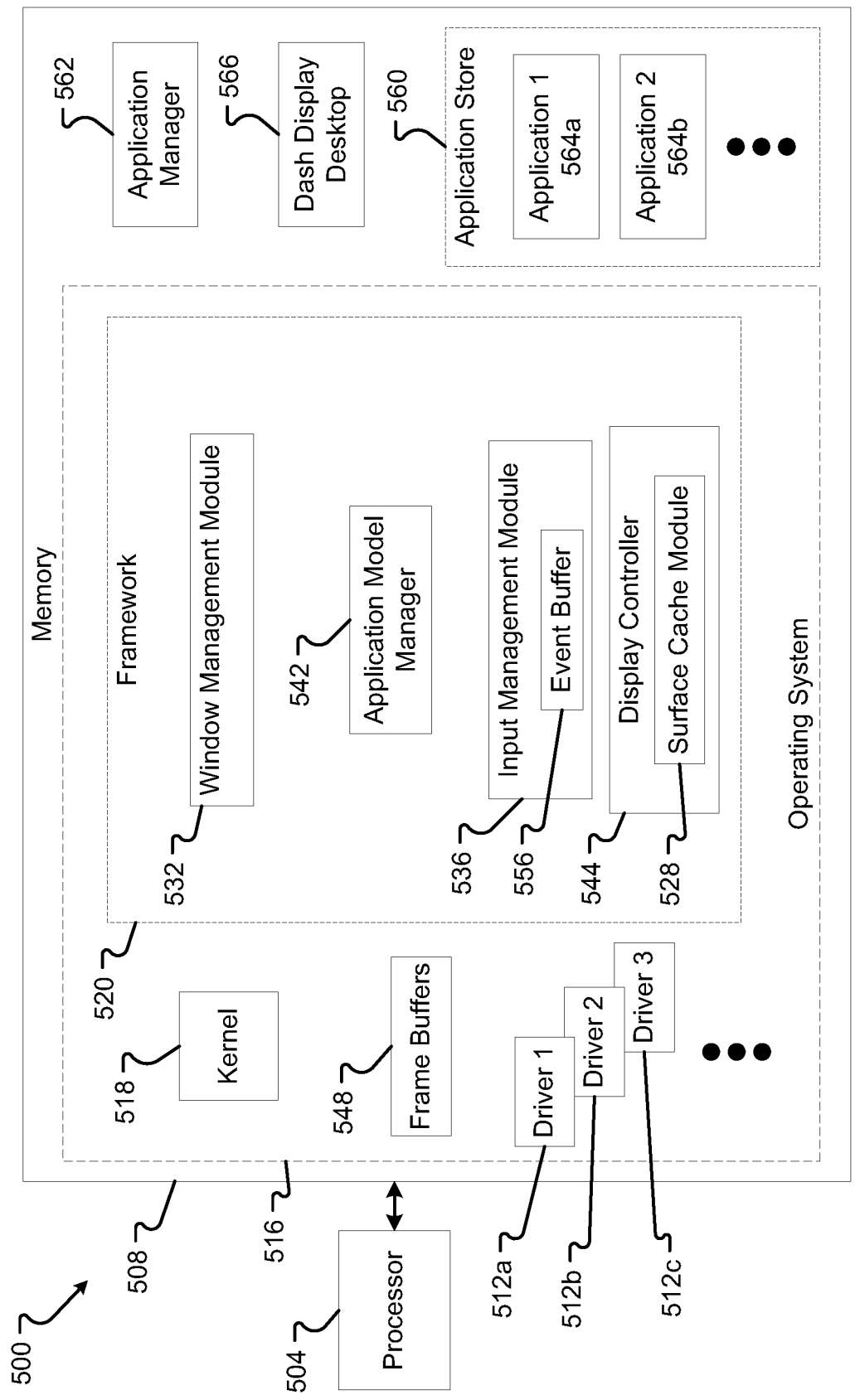
FIG. 5 is a block diagram of an embodiment of the device software and/or firmware.

FIG. 5 depicts a block diagram of an embodiment of the device software and/or firmware. The memory 508 may store and the processor 504 may execute one or more software components. These components can include at least one operating system (OS) 516, an application manager 562, a dash display desktop 566, and/or one or more applications 564*a* and/or 564*b* from an application store 560. The OS 516 can include a framework 520, one or more frame buffers 548, one or more drivers 512, and/or a kernel 518. The OS 516 can be any software, consisting of programs and data, which manages computer hardware resources and provides common services for the execution of various applications 564. The OS 516 can be any operating system and, at least in some embodiments, dedicated to mobile devices, including, but not limited to, Linux, ANDROID™, iPhone OS (IOS™), WINDOWS PHONE 7™, etc. The OS 516 is operable to provide functionality to the device 100 by executing one or more operations, as described herein.

The applications 564 can be any higher level software that executes particular console functionality for the user. Applications 564 can include programs such as vehicle control applications, email clients, web browsers, texting applications, games, media players, office suites, etc. The applications 564 can be stored in an application store 560, which may represent any memory or data storage, and the management software associated therewith, for storing the applications 564. Once executed, the applications 564 may be run in a different area of memory 508.

The framework 520 may be any software or data that allows the multiple tasks running on the device to interact. In embodiments, at least portions of the framework 520 and the discrete components described hereinafter may be considered part of the OS 516 or an application 564. However, these portions will be described as part of the framework 520, but those components are not so limited. The framework 520 can include, but is not limited to, a Surface Cache module 528, a Window Management module 532, an Input Management module 536, an Application Model Manager 542, a Display Controller, one or more frame buffers 548, and/or an event buffer 556.

The Surface Cache module 528 includes any memory or storage and the software associated therewith to store or cache one or more images of applications, windows, and/or console screens. A series of active and/or non-active windows (or other display objects, such as, a desktop display) can be associated with each display. An active window (or other display object) is currently displayed. A non-active window (or other display objects) was opened and, at some time, displayed but are now not displayed. To enhance the user experience, before a window transitions from an active state to an inactive state, a "screen shot" of a last generated image of the window (or other display object) can be stored. The Surface Cache module 528 may be operable to store a bitmap of the last active image of a window (or other display object) not currently displayed. Thus, the Surface Cache module 528 stores the images of non-active windows (or other display objects) in a data store.

In embodiments, the Window Management module 532 is operable to manage the windows (or other display objects) that are active or not active on each of the displays. The Window Management module 532, based on information from the OS 516, or other components, determines when a window (or other display object) is visible or not active. The Window Management module 532 may then put a non-visible window (or other display object) in a "not active state" and, in conjunction with the Task Management module Task Management 540 suspends the application's operation. Further, the Window Management module 532 may assign a display identifier to the window (or other display object) or manage one or more other items of data associated with the window (or other display object). The Window Management module 532 may also provide the stored information to the application 564, or other components interacting with or associated with the window (or other display object). The Window Management module 532 can also associate an input task with a window based on window focus and display coordinates within the motion space.

The Input Management module 536 is operable to manage events that occur with the device. An event is any input into the window environment, for example, a user interface interactions with a user. The Input Management module 536 receives the events and logically stores the events in an event buffer 556. Events can include such user interface interactions as a "down event," which occurs when the screen 204 receives a touch signal from a user, a "move event," which occurs when the screen 204 determines that a user's finger is moving across a screen(s), an "up event, which occurs when the screen 204 determines that the user has stopped touching the screen 204 etc. These events are received, stored, and forwarded to other modules by the Input Management module 536. The Input Management module 536 may also map screen inputs to a motion space which is the culmination of all physical and virtual display available on the device.

The frame buffer 548 is a logical structure(s) used to render the user interface. The frame buffer 548 can be created and destroyed by the OS kernel 518. However, the Display Controller 544 can write the image data, for the visible windows, into the frame buffer 548. A frame buffer 548 can be associated with one screen or multiple screens. The association of a frame buffer 548 with a screen can be controlled dynamically by interaction with the OS kernel 518. A composite display may be created by associating multiple screens with a single frame buffer 548. Graphical data used to render an application's window user interface may then be written to the single frame buffer 548, for the composite display, which is output to the multiple screens 204. The Display Controller 544 can direct an application's user interface to a portion of the frame buffer 548 that is mapped to a particular display 208, thus, displaying the user interface on only one screen 204. The Display Controller 544 can extend the control over user interfaces to multiple applications, controlling the user interfaces for as many displays as are associated with a frame buffer 548 or a portion thereof. This approach compensates for the physical screen 204 and any other console screens that are in use by the software component above the Display Controller 544.

The Application Manager 562 is an application that provides a presentation layer for the window environment. Thus, the Application Manager 562 provides the graphical model for rendering. Likewise, the Desktop 566 provides the presentation layer for the Application Store 560. Thus, the desktop provides a graphical model of a surface having selectable application icons for the Applications 564 in the Application Store 560 that can be provided to the Window Management Module 556 for rendering.

Further, the framework can include an Application Model Manager (AMM) 542. The Application Manager 562 may interface with the AMM 542. In embodiments, the AMM 542 receives state change information from the device 100 regarding the state of applications (which are running or suspended). The AMM 542 can associate bit map images from the Surface Cache Module 528 to the applications that are alive (running or suspended). Further, the AMM 542 may provide a list of executing applications to the Application Manager 562.

Figure 6:
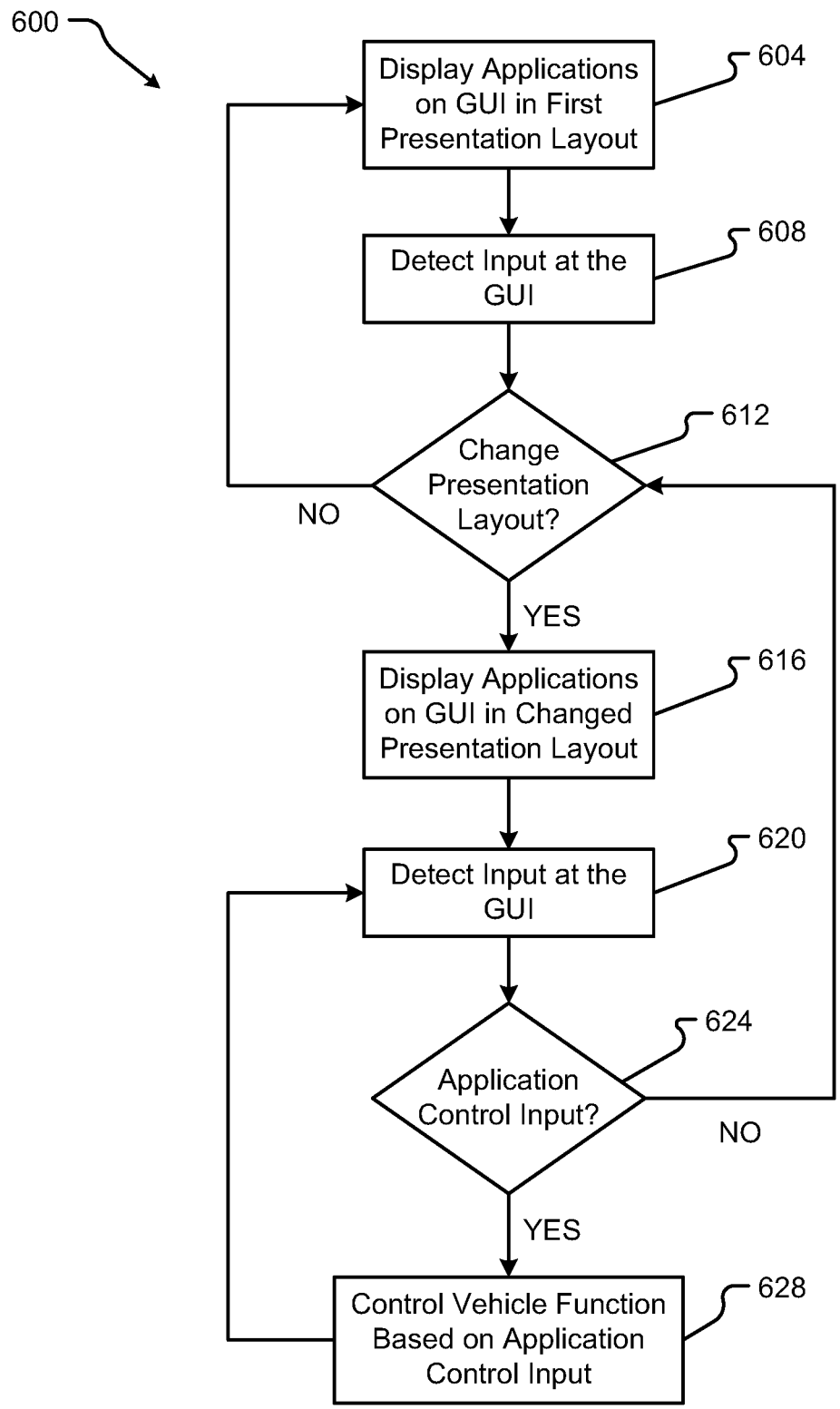
FIG. 6 is a flow diagram depicting a first configurable dash display method in accordance with embodiments of the present disclosure.

Referring to FIG. 6, a flow diagram depicting a first configurable dash display method 600 is shown in accordance with embodiments of the present disclosure. A device 100 may be displaying one or more applications on the GUI of a dash display in a first presentation layout (step 604). The method continues by detecting input received at the device 100, in particular at the GUI (step 608). This input is interpreted by the device 100 to determine a corresponding processor action (step 612). For instance, the received input may represent an instruction to change the first presentation layout displayed on the device 100 at which point the method continues at step 616. Alternatively, the received input may be some other type of recognized and/or unrecognized input and the processor may determine alternate action based on this input. In the event that the input is determined as an instruction to change the presentation layout, the processor selects a second presentation layout to display on the GUI, and sends a command to display the second presentation layout at step 616.

The method 600 may continue by detecting further input at the GUI (step 620). This further input may represent a plurality of commands, including but not limited to a change presentation layout command or an application control command. In the event that the input represents a change presentation layout command, the method may continue at 612. However, in the event that the input represents an application control command, the method continues at step 628. The processor may determine which vehicle function is to be controlled based on the input and control the function as the input directs (step 628). Once the vehicle function is controlled, the method 600 may continue at step 620 to detect additional input and may even repeat the process 600.

Figure 7:
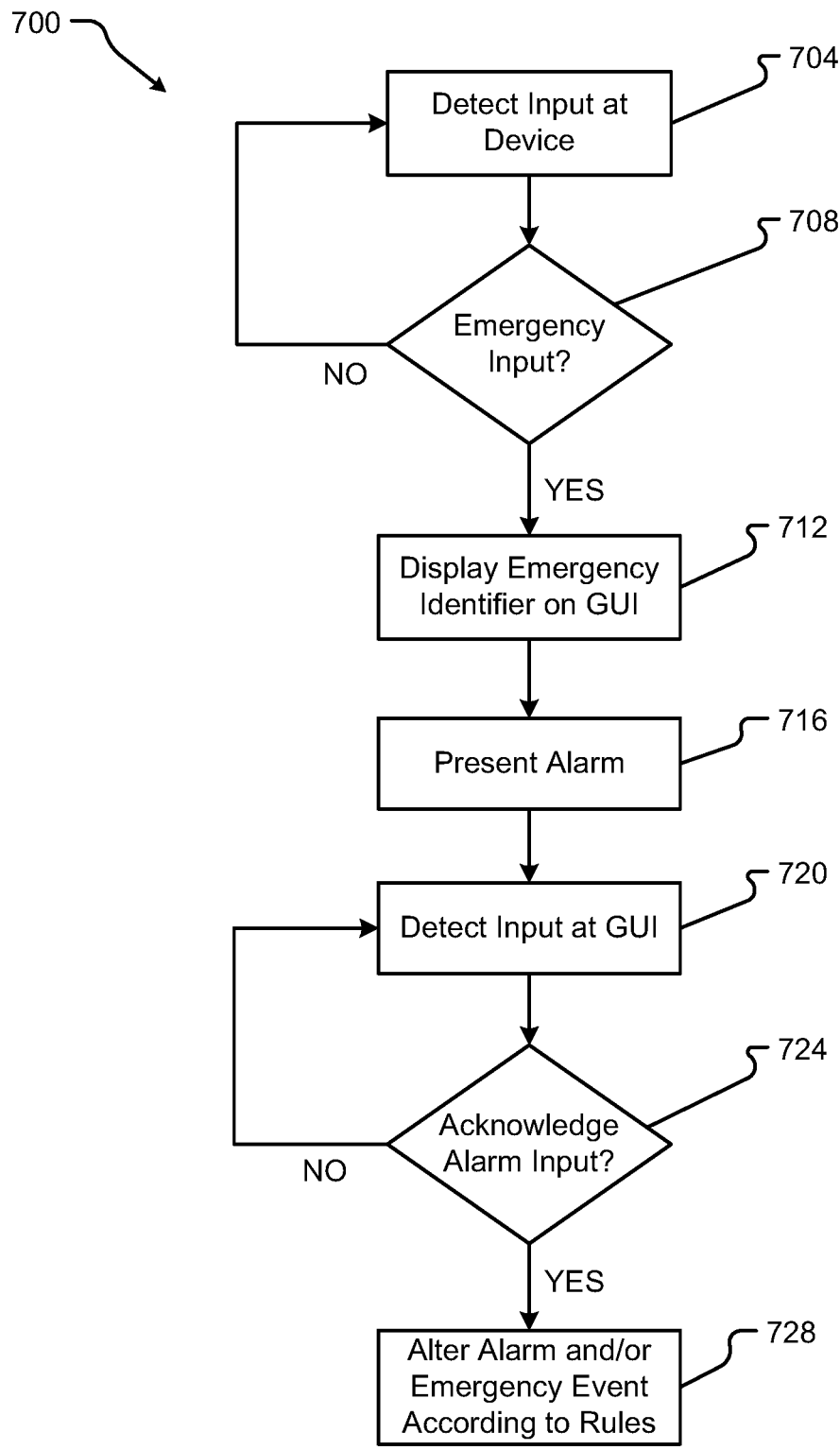
FIG. 7 is a flow diagram depicting a second configurable dash display method in accordance with embodiments of the present disclosure.

FIG. 7 is a flow diagram depicting a second configurable dash display console method 700 in accordance with embodiments of the present disclosure. In general, the method 700 is directed to an automatically configurable dash display in response to specific inputs detected. The method begins at step 704, where the device detects input received. This input may be received via a communication interface with the vehicle and/or with associated devices. For instance, input may include but is not limited to that received from one or more phones associated with a vehicle. Additionally or alternatively, the input may be received from sensors and/or equipment associated with the vehicle. For example, the input may be in the form of a sensor signal sent via CAN Bus and associated controllers to the device 100. The method 700 continues at step 708, where the processor determines whether the input received qualifies as an emergency event. It may be desired to store in memory specific signals and/or signal conditions that the device 100 may refer to in determining one or more emergency event matches. In the event that the input received indicates an emergency event has occurred, an emergency identifier may be displayed on the GUI (step 712). This identifier may be displayed on any available GUI that is in communication with, or part of, the device 100, including a heads-up display or HUD unit.

The method 700 may include an alert and/or alarm along with the display of an emergency identifier when an emergency is detected (step 716). The alarm, as described above, may include at least one audible output, and/or visual alarm indicators. Visual alarm indicators may emphasize an existing and/or newly displayed application. Additionally or alternatively, the visual alarm indicator may de-emphasize non-essential displayed applications. This de-emphasis may take the form, but is not limited to, one or more of dimming, hiding, resizing, and generally altering the display of one or more applications. It is anticipated that the alarm may be acknowledged by a user from entering input at the device 100 (step 724). Further, the alarm and/or the emergency event may be reset based on rules (step 728). For instance, a user may acknowledge an alarm event and silence, reset, and/or remove an alarm by providing a specific input to the display. Rules stored in a memory may determine whether the alarm and/or emergency event may be reset. The device 100 may detect input at the GUI, which may be equipped with various features as described above, including a camera, microphone, and touch sensitive display (step 720). For example, the device 100 may be configured to receive audible, visual, touch, and/or a combination thereof as the various input. Additionally or alternatively, one or more specific icons may be selected automatically by the processor. This automatic selection may be in response to certain signals that represent a priority of emergency.

Figure 8:
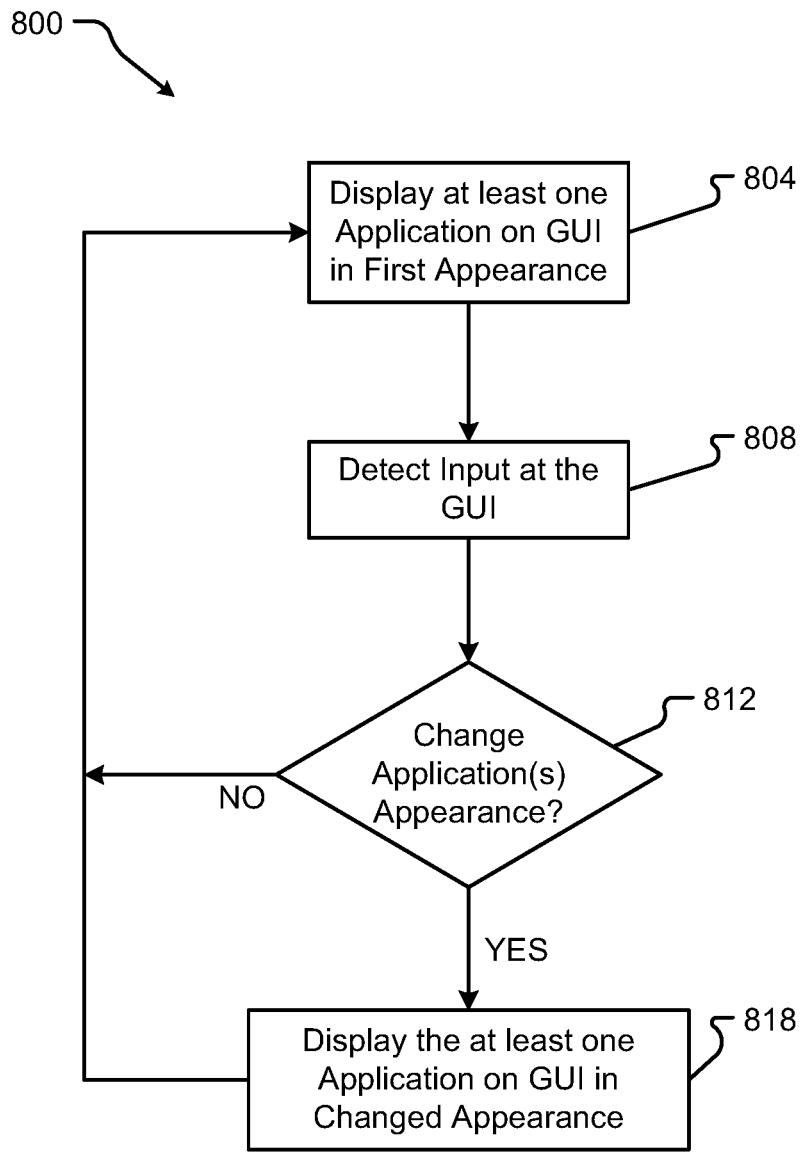
FIG. 8 is a flow diagram depicting a third configurable dash display method in accordance with embodiments of the present disclosure.

FIG. 8 is a flow diagram depicting a third configurable dash display method in accordance with embodiments of the present disclosure. In general, the method is directed to changing an appearance of one or more applications based on input received. A device 100 may be displaying one or more applications on the GUI and/or HUD unit of a dash display in a first appearance (step 804, 806). The method continues by detecting input received at the device, in particular at a GUI associated with the device 100 (step 808). This input is interpreted by the device 100 to determine a corresponding processor action (step 812). For example, the received input may represent an instruction to alter the first appearance of at least one application displayed on the GUI at which point the method continues at step 818. Alternatively, the received input may be some other type of recognized and/or unrecognized input and the processor may determine at least one other action based on this input. In the event that the input is determined as an instruction to change the at least one application appearance, the processor selects at least one second application appearance to display on at least one of the GUI and HUD unit, and sends a command to display the at least one second application appearance at step 818. The method 800 may continue by repeating the process for any other appearance changes and/or layout changes.

The exemplary systems and methods of this disclosure have been described in relation to configurable vehicle dash displays and associated devices. As suggested by this disclosure, features may be shared between a configurable dash display device 100 and a configurable HUD device 300. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In some embodiments, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

I claim:

1. A method of configuring a heads-up display ("HUD") of a vehicle dash, comprising:
receiving an input at the GUI, wherein the input corresponds to an instruction to minimize at least a first layout of a vehicle dash information and maximize at least a second layout of the vehicle dash information, and wherein the second layout of the vehicle dash information is visually different from the first layout of the same vehicle dash information;
displaying the first and second layout of the vehicle dash information by at least one of the GUI or the HUD, wherein at least one of the GUI or HUD is partitioned into two or more zones, wherein a first zone of the two or more zones is configured to display the first layout of the vehicle dash information, and wherein a second zone of the two or more zones is configured to display the second layout of the same vehicle dash information, wherein the minimizing of the first layout and maximizing of the second layout is by sliding a zone partition either left, right, up, or down at the GUI input by at least one of touch or gesture input.

2. The method of claim 1, wherein at least one of the first or second layout of the vehicle dash information is selected from one or more preconfigured layouts.

3. The method of claim 1, wherein the vehicle dash information further comprises readouts including at least one of a speedometer, odometer, tachometer, trip meter, fuel gage, temperature gage, electrical gage, and indicators.

4. The method of claim 1, further comprising:
receiving a second input at the GUI, wherein the second input represents an instruction to cease a display of one or more applications to at least one of the GUI and the HUD unit, wherein at least one of the first and second layouts includes a type of vehicle dash information not in the other of the first and second layouts.

5. The method of claim 1, further comprising:
receiving a second input at the GUI, wherein the second input represents an instruction to alter a first display position associated with at least one application of the one or more applications;
determining, by a processor, the first display position to alter based on the second input;
altering the first display position of the at least one application based on the second input;
and displaying, the altered first display position of the at least one application as a second display position on the HUD unit.

6. The method of claim 1, further comprising altering the first layout of the one or more applications to the second layout of the one or more applications includes adding at least one application to be displayed on the HUD unit.

7. The method of claim 1, further comprising altering the first layout of the one or more applications to the second layout of the one or more applications includes removing at least one application from being displayed on the HUD unit.

8. The method of claim 1, further comprising:
receiving a second input at the GUI, wherein the second input corresponds to an instruction to save the second layout in a memory; and
saving the second layout in a memory.

9. The method of claim 1, further comprising:
receiving one or more signals sent from a plurality of sensing elements associated with a vehicle;
interpreting, by a processor, the one or more signals to determine whether an emergency event has occurred;
determining that an emergency event has occurred; and
displaying, automatically, at least one emergency identifier on the HUD unit.

10. The method of claim 9, wherein the interpretation step further comprises:
referring to a memory, wherein the memory stores rules that define a plurality of signal conditions corresponding to an emergency event.

11. The method of claim 9, wherein the emergency identifier is displayed as a third layout of the one or more applications on the HUD unit.

12. The method of claim 9, wherein the emergency identifier is displayed on the HUD unit and at least one GUI.

13. The method of claim 9, wherein the emergency identifier is displayed over at least one of the first and second layout of the one or more applications on the HUD unit.

14. The method of claim 13, wherein an appearance of at least one of the first and second layout is altered to emphasize the display of the emergency identifier.

15. A non-transitory computer readable medium having instructions stored thereon that, when executed by a processor, perform the method of claim 1.

16. A method of configuring an appearance of at least one application shown on a display of a vehicle dash, comprising:
displaying, at a same time, at least a first and second appearance of the at least one application on at least one of a graphical user interface ("GUI") or a HUD unit, wherein the one application corresponds to one or more instruments associated with the vehicle dash, and wherein the at least first appearance corresponds to a first aesthetic of the one application and at least the second appearance corresponds to a second aesthetic of said application; and
receiving a first input at the GUI, the first input corresponding to an instruction to alter the first appearance of said application to a second appearance of said application by sliding a zone partition either left, right, up, or down at the GUI input by at least one of touch or gesture input, thereby maximizing display of the first appearance and minimizing display of the second appearance.

17. The method of claim 16, wherein altering the first appearance of the one or more applications to the second appearance of the one or more applications includes adjusting a size of at least one application to be displayed on the HUD unit.

18. The method of claim 16, wherein altering the first appearance of the one or more applications to the second appearance of the one or more applications includes adjusting at least one scale of at least one application to be displayed on the HUD unit.

19. The method of claim 16, further comprising:
receiving a second input at the GUI, wherein the second input corresponds to an instruction to save the second appearance in a memory; and
saving the second appearance in a memory.

20. A non-transitory computer readable medium having instructions stored thereon that, when executed by a processor, perform the method of claim 16.

21. A device for configuring a heads-up display ("HUD") of a vehicle dash to display one or more vehicle applications, comprising:
a Graphical User Interface ("GUI") including a first display area;

an input gesture area of the first display area;
a HUD unit;
a vehicle signal input/output port, wherein the vehicle signal input/output port is configured to receive and send signals to and from a plurality of vehicle devices;
a non-transitory computer readable medium having instructions stored thereon that, when executed by a processor, perform the method comprising:
displaying, at a first time, vehicle dash information in at least a first layout and second layout on at least one of the GUI and the HUD unit to project the vehicle dash information above a vehicle dash, wherein the vehicle dash information comprises the same application corresponding to similar vehicle readouts in the at least first and second layouts;
receiving a first input at the GUI, wherein the first input corresponds to an instruction to alter the first layout of the vehicle dash information to a second layout of the vehicle dash information, and wherein the second layout of the vehicle dash information is different from the first layout of the vehicle dash information; and
wherein the altering is by sliding a zone partition either left, right, up, or down at the GUI input by at least one of touch or gesture input, thereby maximizing display of the first layout and minimizing display of the second layout.

22. The device of claim 21, wherein the HUD unit further comprises:
a projector unit, wherein the projector unit is configured to project at least one image representing content associated with the vehicle dash;
a combiner, wherein the combiner is configured to redirect the at least one image into a field of view of at least one user; and
a video generating processor, wherein the video generating processor is configured to generate the at least one image to be displayed by the projector unit.

* * * * *